(12) United States Patent
Osumi et al.

(10) Patent No.: US 7,735,313 B2
(45) Date of Patent: Jun. 15, 2010

(54) METHOD OF RAISING TEMPERATURE IN EXHAUST-GAS PURIFIER AND EXHAUST-GAS PURIFICATION SYSTEM

(75) Inventors: Kazuo Osumi, Fujisawa (JP); Yousuke Tanaka, Fujisawa (JP); Osamu Sakamoto, Fujisawa (JP); Junichi Oonuma, Fujisawa (JP); Kazuhiro Enoki, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 313 days.

(21) Appl. No.: 11/883,443

(22) PCT Filed: Jan. 11, 2006

(86) PCT No.: PCT/JP2006/300166

§ 371 (c)(1),
(2), (4) Date: Jul. 31, 2007

(87) PCT Pub. No.: WO2006/080187

PCT Pub. Date: Aug. 3, 2006

(65) Prior Publication Data

US 2008/0148715 A1    Jun. 26, 2008

(30) Foreign Application Priority Data

Jan. 31, 2005  (JP) ............................. 2005-022814
Jan. 31, 2005  (JP) ............................. 2005-023615

(51) Int. Cl.
*F01N 3/00* (2006.01)
(52) U.S. Cl. ............................. 60/285; 60/274; 60/286; 60/297; 60/303; 60/311
(58) Field of Classification Search ............... 60/284, 60/285, 297, 301, 311, 274, 286, 295, 303
See application file for complete search history.

(56) References Cited

U.S. PATENT DOCUMENTS 5,462,039 A * 10/1995 Mamiya et al. ............. 123/686

(Continued)

FOREIGN PATENT DOCUMENTS

JP           3-199640          8/1991

(Continued)

OTHER PUBLICATIONS

International Search Report of International Published Application No. PCT/JP2006/080187 (mailed Apr. 25, 2006).

(Continued)

*Primary Examiner*—Binh Q. Tran
(74) *Attorney, Agent, or Firm*—Staas & Halsey LLP

(57) ABSTRACT

An exhaust-gas after-treatment device having an oxygen storage capacitor substance which releases oxygen when the exhaust-gas is rich in air-fuel ratio and stores oxygen and heats up by itself when the exhaust-gas is lean in air-fuel ratio. The air-fuel ratio for the exhaust-gas flowing into the device is regulated so as to alternately come into the rich condition and the lean condition when the temperature of the exhaust-gas is not higher than a given temperature and when the device is not in a regeneration condition. Thus, when the device having a deNOx catalyst and a diesel particulate filter is not in a regeneration condition, the temperature of the device is raised by utilizing the self-heating function of the oxygen storage capacitor substance during oxygen absorption. As a result, the purification rate for NOx and particulate matter at the time when the temperature of the exhaust-gas is low is improved.

16 Claims, 13 Drawing Sheets

U.S. PATENT DOCUMENTS 6,651,422 B1 * 11/2003 LeGare .................. 60/277
2003/0108465 A1 * 6/2003 Voss et al. .............. 423/213.2

FOREIGN PATENT DOCUMENTS

| JP | 8-135492 | 5/1996 |
| JP | 2000-54887 | 2/2000 |
| JP | 2000-154713 | 6/2000 |
| JP | 2002-188435 | 7/2002 |
| JP | 2002188435 A * | 7/2002 |
| JP | 2002-273226 | 9/2002 |
| JP | 3370957 | 11/2002 |
| JP | 2002-349238 | 12/2002 |
| JP | 2002349238 A * | 12/2002 |
| JP | 2003-503191 | 1/2003 |
| JP | 2003-190793 | 7/2003 |
| JP | 2003-193822 | 7/2003 |
| JP | 2004-337773 | 12/2004 |
| JP | 2004337773 A * | 12/2004 |

OTHER PUBLICATIONS

Patent Abstracts of Japan, Publication No. 2000-54887, Published Feb. 22, 2000.
Patent Abstracts of Japan, Publication No. 2003-193822, Published Jul. 9, 2003.
Patent Abstracts of Japan Publication No. 2003-190793, Published Jul. 8, 2003.
Patent Abstracts of Japan, Publication No. 2000-154713, Published Jun. 6, 2000.

* cited by examiner

METHOD OF RAISING TEMPERATURE IN EXHAUST-GAS PURIFIER AND EXHAUST-GAS PURIFICATION SYSTEM

This application claims the benefit under 35 U.S.C. § 371, of PCT International Application No. PCT/JP2006/300166, filed Jan. 11, 2006, and Japanese Application No.(s) 2005-022814, 2005-023615 filed Jan. 31, 2005 respectively in Japan, the contents of which are incorporated herein by reference.

FIELD OF THE INVENTION

The present invention relates to a method of raising temperature in an exhaust-gas after-treatment device (purifier) and an exhaust-gas after-treatment (purification) system provided with a deNOx catalyst to reduce nitrogen oxides (hereinafter referred to as NOx) and a diesel particulate filter (hereinafter referred to as DPF) to oxidize particulate matter (hereinafter referred to as PM) in an exhaust-gas from an internal combustion engine.

DESCRIPTION OF THE RELATED ART

Various studies and developments have been in progress for exhaust-gas after-treatment catalysts used in an internal combustion engine such as a diesel engine, lean-burning gasoline engine or the like. In order to reduce NOx in the exhaust-gas, a deNOx catalyst such as a lean NOx trap catalyst (LNT) and a NOx direct reduction type catalyst have been proposed. Also, in order to oxidize PM, a DPF has been proposed.

Basically, a lean NOx trap catalyst is a catalyst carrying noble metals that promote oxidation/reduction reactions and a NOx absorption material (NOx absorption substance) which functions to absorb/release NOx from a catalyst carrier such as aluminum oxide (alumina) or the like. The noble metals include platinum (Pt), palladium (Pd) and the like. The NOx absorption material is formed from alkali earth metals such as barium (Ba) and the like and alkali metals such as potassium (K) and the like.

When an air-fuel ratio of an inflow exhaust-gas is in a lean condition (excessive oxygen) where oxygen (Oz) is present in the atmosphere, the lean NOx trap catalyst oxidizes nitric oxide (NO) in the exhaust-gas by a catalytic action of the noble metals to convert it into nitrogen dioxide ($NO_2$), and this nitrogen dioxide ($NO_2$) is accumulated in a NOx absorption material as nitrate salts ($Ba_2 NO_4$ or the like).

Also, the air-fuel ratio in the inflow exhaust-gas is at a theoretical air-fuel ratio or in a rich condition where there is no longer any oxygen present in the atmosphere (low oxygen concentration), the NOx absorption material such as barium (Ba) binds to carbon monoxide (CO) and $NO_2$ is decomposed and released from the nitrate salt. This released nitrogen dioxide ($NO_2$) is reduced with unburned hydrocarbon (HC), carbon monoxide (CO) and the like contained in the exhaust-gas through a three-way function of the noble metals and thereby becomes nitrogen ($N_2$). And then by this, components in the exhaust-gas are released to the atmosphere as harmless substances such as carbon dioxide ($CO_2$), water ($H_2O$), nitrogen ($N_2$) and the like.

Therefore, in an exhaust-gas after-treatment system provided with the lean NOx trap catalyst, NOx catalyst regeneration operation is carried out when the NOx absorption capability gets close to the saturation. In this NOx catalyst regeneration operation, rich control for restoring the NOx absorption capability is carried out by bringing the air-fuel ratio of the exhaust-gas into the rich condition to lower the oxygen concentration in the exhaust-gas flowing into the lean NOx trap catalyst. By this, NOx absorbed by the lean NOx trap catalyst is released, and the released NOx is reduced by the noble metal catalyst.

The NOx direct reduction type catalyst (DCR) is a catalyst for direct reduction of NOx. This catalyst, for example, is formed by carrying a catalyst component metal such as rhodium (Rh) and palladium (Pd) on a catalyst carrier such as β zeolite. Moreover, the following may be the case. Cerium (Ce) which contributes to reducing the oxidizing action of those metals and maintaining NOx reduction capability is mixed in those metals. A three-way catalyst is provided at a lower layer so as to promote the oxidation/reduction reaction, particularly the reduction reaction of NOx in the rich condition. Iron (Fe) is added to the carrier so as to improve the NOx reduction rate.

This NOx direct reduction type catalyst directly reduces NOx to nitrogen ($N_2$) in the lean condition. However, at the reduction, oxygen ($O_2$) is adsorbed by metal, which is an active substance of the catalyst, which lowers the reduction performance. Thus, in the exhaust-gas after-treatment system provided with the NOx direct reduction type catalyst, when NOx reduction capability gets close to the saturation, the NOx catalyst regeneration operation is carried out. In this NOx catalyst regeneration operation, rich control for restoring the NOx reduction capability is carried out by bringing the air-fuel ratio of the exhaust-gas into the rich condition so as to lower the oxygen concentration of the inflow exhaust-gas. By this rich control, the oxygen ($O_2$) adsorbed from the active substance of the catalyst is released, and the active substance is regenerated.

DPF is formed from a filter of a monolith honeycomb wall-through type in which an inlet and an outlet of a porous ceramic honeycomb channel are sealed alternately. This DPF collects PM in the exhaust-gas. In order to burn and eliminate the collected PM even at a lower exhaust-gas temperature, a continuous regeneration type DPF in which the oxidation catalyst is provided on an upstream side of the DPF or a continuous regeneration type DPF in which the oxidation catalyst and PM oxidation catalyst are carried by the DPF is used in many cases.

In this continuous regeneration type DPF, when the exhaust-gas temperature is approximately 350° C. or above, the PM collected by the DPF is continuously burned to be eliminated, and the DPF is regenerated by itself. However, when the exhaust-gas temperature is low, the PM can not be oxidized to be eliminated, but clogging of the filter progresses.

Therefore, in the exhaust-gas after-treatment system provided with the DPF, when the clogging of the filter progresses and an exhaust pressure is increased, the DPF regeneration operation is carried out. In this DPF regeneration operation, the temperature of the DPF is raised by raising the exhaust-gas temperature or heating by a heater so that the collected PM is forcedly burned to be eliminated.

And in the exhaust-gas processing for an internal combustion engine, according to the respective reduction objectives, a single deNOx catalyst, a single DPF, and an exhaust-gas after-treatment device combined with the deNOx catalyst and DPF are used.

However, in these exhaust-gas after-treatment devices, when the exhaust-gas temperature drops to 300° C. or below in purification of NOx and PM, activity of the catalysts such as deNOx catalyst (LNT), the oxidation catalyst of the continuous regeneration type DPF and the PM oxidation catalyst is lowered. Therefore, as the relation between the reduction rates of the lean NOx trap catalyst (No) and the NOx direct reduction type catalyst (Nd) and the catalyst temperature shown in FIG. 18, when the catalyst temperature drops, the NOx reduction rate is extremely lowered. The PM oxidation has the similar tendency.

Thus, when the exhaust-gas temperature is low in idling driving or low-load driving, the purification rates of NOx and PM are extremely lowered, and improvement of the purification performance of the exhaust-gas after-treatment device is a big problem when the exhaust-gas temperature is at 300° C. or below.

On the other hand, as described in the Japanese Patent No. 3370957, for example, an exhaust-gas after-treatment device for an internal combustion engine is proposed, which carries an oxygen storage capacitor component that absorbs oxygen in an exhaust-gas when the air-fuel ratio of the exhaust-gas is lean and releases the absorbed oxygen when the air-fuel ratio of the exhaust-gas is rich.

This oxygen storage capacitor component is cerium (Ce) carried in the form of a ceria-zirconia solid solution. This oxygen storage capacitor component forms cerium oxide IV ($CeO_2$) and stores oxygen at the lean air-fuel ratio. At the rich air-fuel ratio, cerium oxide IV releases oxygen and becomes cerium oxide III ($Ce_2O_3$). And the mechanism is considered as follows. By heat generation caused by an oxidation reaction between $O_2$ released from this oxygen storage capacitor component and HC, CO components in the exhaust-gas (for example, $2CeO_2+CO \rightarrow Ce_2O_3+CO_2$, $2CeO_2+H_2 \rightarrow Ce_2O_3+H_2O$), the catalyst component temperature is raised, by which the catalyst activity is improved and the NOx reduction rate is improved.

As described in the Japanese Patent Application Kokai Publication No. 2000-54887, for example, in order to prevent overheat of the catalyst provided in an exhaust passage, an internal combustion engine is proposed, in which a catalyst having an $O_2$ storage function (oxygen-storing capability) is arranged in the exhaust passage. Also, as described in the Japanese Patent Application Kokai Publication No. 2003-190793 and the Japanese Patent Application Kokai Publication No. 2003-193822, for example, in the DPF, in order to oxidize PM and improve the PM oxidation speed, an exhaust-gas after-treatment device provided with a filter type catalyst for diesel exhaust-gas purification carrying a porous oxidized substance including at least cerium (Ce) element in an exhaust-gas purification layer of a filter bulkhead, or an exhaust-gas after-treatment device provided with an active oxygen generator including cerium (Ce) is also proposed.

The inventors have found that in an oxygen storage capacitor substance which releases oxygen when the exhaust-gas air-fuel ratio is in the rich condition and stores oxygen in the lean condition, self-heating occurs at oxygen absorption and they thought of using same for raising a temperature.

When the oxygen storage capacitor substance is formed from cerium oxide IV ($CeO_2$), in rich condition, Ce becomes trivalent cerium oxide III ($Ce_2O_3$) by the reaction of $CeO_2 \rightarrow (½)Ce_2O_3+(¼)O_2$, and cerium oxide IV is reduced. This reaction is an endothermic reaction, and the heat of $\Delta H=191$ kJ/mol is absorbed. On the other hand, when the condition is switched to the lean condition, Ce returns to quadrivalent cerium oxide IV ($CeO_2$) by the reaction of $(½)Ce_2O_3+(¼)O_2 \rightarrow CeO_2$, and cerium oxide III is oxidized. This reaction is an exothermic reaction, and $\Delta H=-191$ kJ/mol is generated. These reactions are reversible.

Gibbs free energy $\Delta rG°$ and an equilibrium constant Kp relating to this reaction are shown in FIGS. 16 and 17. FIG. 16 shows a relation between $\Delta rG°$ and the temperature. Under the atmospheric condition, the further $\Delta rG°$ goes to the negative (−) side, the higher the probability of occurrence of the reaction becomes, while the further $\Delta rG°$ goes to the positive (+) side, the reaction hardly occurs or becomes a reverse reaction. FIG. 17 shows the relation between Kp and the temperature. The larger Kp becomes, the faster the oxidation reaction speed becomes. Therefore, it is known from FIG. 16 as well as FIG. 17 that the oxidation reaction easily occurs and the oxidation reaction is faster at a lower temperature. As above, when the exhaust-gas temperature is low, which requires raising temperature required for the catalytic reaction, the oxidation reaction speed is fast, and a large effect can be expected for the temperature rise of the exhaust-gas after-treatment device.

And in this rich condition, heat more than absorbed can be generated by the oxidation reaction (burning) between the oxygen released at the oxygen storage capacitor substance and a reducing agent, and this oxidation reaction heat of the reducing agent can be utilized. Also, in the lean condition, the reaction heat of the oxidation reaction when the oxygen storage capacitor substance stores oxygen can be utilized.

Particularly, by actively utilizing the self-heating of the oxygen storage capacitor substance occurring at switching from the rich condition to the lean condition, the temperature of the catalyst surface carrying the oxygen storage capacitor substance of the exhaust-gas after-treatment device can be raised and the temperature of the deNOx catalyst and the DPF can be raised. By this, the exhaust-gas purification rate can be improved.

SUMMARY OF THE INVENTION

The present invention was made in order to solve the above problem upon obtaining the above finding, and has an objective to provide a method of raising exhaust-gas temperature in an exhaust-gas after-treatment device (an exhaust-gas purifier) and an exhaust-gas after-treatment system (an exhaust-gas purification system) which can improve NOx and PM purification rates when the exhaust-gas temperature is low by raising the temperature in the exhaust-gas after-treatment device or the temperature of an exhaust-gas flowing into the exhaust-gas after-treatment device utilizing a self-heating action of an oxygen storage capacitor substance at oxygen absorption at a time other than regeneration of deNOx catalyst or DPF regeneration in an exhaust-gas after-treatment device provided with the deNOx catalyst or/and DPF.

The method of raising exhaust-gas temperature in an exhaust-gas after-treatment device in order to achieve the above objective characterized in that in an exhaust-gas after-treatment device provided with an oxygen storage capacitor substance which releases oxygen when an air-fuel ratio of the exhaust-gas is in a rich condition and stores oxygen as well as heats up itself in a lean condition, the air-fuel ratio of the exhaust-gas flowing into the exhaust-gas after-treatment device is controlled so that the rich condition and the lean condition are alternately repeated when the exhaust-gas temperature is not higher than a given temperature at a time other than regeneration control of the exhaust-gas after-treatment device.

Alternatively, the method of raising exhaust-gas temperature in an exhaust-gas after-treatment device in order to achieve the above objective is characterized in that in an exhaust-gas after-treatment system provided with a carrier for carrying an oxygen storage capacitor substance which releases oxygen when an air-fuel ratio of the exhaust-gas is in a rich condition and stores oxygen as well as heats up itself in a lean condition on an upstream side, and provided with an exhaust-gas after-treatment device arranged on a downstream side, the air-fuel ratio of the exhaust-gas flowing into the carrier is controlled so that the rich condition and the lean condition are alternately repeated when the exhaust-gas temperature is not higher than a given temperature at a time other than regeneration control of the exhaust-gas after-treatment device.

Moreover, the method of raising exhaust-gas temperature in an exhaust-gas after-treatment device is characterized in that the exhaust-gas after-treatment device is provided with at least one of a deNOx catalyst and a DPF.

The method of raising exhaust-gas temperature in an exhaust-gas after-treatment device is characterized in that a substance containing cerium element is used as the oxygen storage capacitor substance.

Also, the method of raising exhaust-gas temperature in an exhaust-gas after-treatment device is characterized in that the ratio of time period in the rich condition and in the lean condition is set to rich condition:lean condition=3:57 to 3:3.

And in the exhaust-gas after-treatment system in order to achieve the above objective, an exhaust-gas after-treatment device is provided with an oxygen storage capacitor substance which releases oxygen when an air-fuel ratio of the exhaust-gas is in a rich condition and stores oxygen as well as heats up itself in a lean condition and a control means for exhaust-gas air-fuel ratio for controlling so that the rich condition and the lean condition are alternately repeated when the exhaust-gas temperature is not higher than a given temperature at a time other than regeneration control of the exhaust-gas after-treatment device.

Also, the exhaust-gas after-treatment system is configured to use a substance containing cerium element as the oxygen storage capacitor substance.

Also, in the above exhaust-gas after-treatment system, the exhaust-gas after-treatment device is formed by a wall-through type honeycomb structure, and an oxygen storage capacitor substance layer of a substance containing cerium element is formed on a surface side of an upstream-side wall surface of the wall-through type honeycomb structure. Moreover, on a wall surface side of a downstream-side wall surface of the wall-through type honeycomb structure, an oxidation catalyst layer is formed, and a deNOx catalyst layer is formed on its surface side. Also, on a surface side of the oxygen storage capacitor substance layer provided on the surface side of the upstream-side wall surface of the wall-through type honeycomb structure, an oxidation catalyst layer is formed.

Moreover, in the oxygen storage capacitor substance layer, a carrying amount of the substance containing cerium element is configured to set to 50 g/L to 200 g/L.

In the above exhaust-gas after-treatment system, the control means for exhaust-gas air-fuel ratio is configured so that the ratio of time period in the rich condition and in the lean condition is set to rich condition:lean condition=3:57 to 3:3.

Moreover, in the method for raising exhaust-gas temperature in the exhaust-gas after-treatment device, the exhaust-gas after-treatment device comprises at least one of the deNOx catalyst and the DPF.

Alternatively, in order to achieve the above objective, the exhaust-gas after-treatment system in which an exhaust-gas after-treatment device is arranged comprises a carrier for carrying an oxygen storage capacitor substance which releases oxygen when the air-fuel ratio of the exhaust-gas is in the rich condition and stores oxygen as well as heats up itself in the lean condition on the upstream side, and the control means for exhaust-gas air-fuel ratio for controlling the air-fuel ratio condition of the exhaust-gas flowing into the carrier so that the rich condition and the lean condition are alternately repeated when the temperature of the exhaust-gas is not higher than a given temperature at a time other than regeneration control of the exhaust-gas after-treatment device.

Also, the above exhaust-gas after-treatment system is configured to use a substance containing cerium element as the oxygen storage capacitor substance. Moreover, the above carrier is configured so that a carrying amount of the substance containing cerium element is set to 50 g/L to 200 g/L.

And in the above exhaust-gas after-treatment system, the control means for exhaust-gas air-fuel ratio is configured so that the ratio of time period in the rich condition and in the lean condition is set to rich condition:lean condition=3:57 to 3:3.

Moreover, in the method of raising the temperature in the exhaust-gas after-treatment device, the exhaust-gas after-treatment device comprises at least one of the deNOx catalyst and the DPF.

That is, in the exhaust-gas after-treatment device using the deNOx catalyst or/and the DPF, in regeneration control of the exhaust-gas after-treatment device such as the NOx catalyst regeneration control or/and the DPF regeneration control, control may be carried out such that the air-fuel ratio of the exhaust-gas is brought into the rich condition, or the rich condition and the lean condition are alternately repeated. When the exhaust-gas temperature is lower than a given temperature at a time other than regeneration control of the exhaust-gas after-treatment device, a reversible oxidation reaction of the oxygen storage capacitor substance is repeated by repeatedly switching the rich condition in the reduction atmosphere and the lean condition in the oxidation atmosphere.

The temperature of a carrier of the oxygen storage capacitor substance is raised utilizing the heat generated by this oxidation reaction. Alternatively, utilizing the heat generated by this oxidation reaction, the temperature of the carrier of the oxygen storage capacitor substance is raised so as to raise the temperature of the exhaust-gas flowing into the exhaust-gas after-treatment device on the downstream side after passing through the carrier. Switching between the rich condition and the lean condition at the carrier of the oxygen storage capacitor substance is carried out by adjusting an oxygen amount in the exhaust-gas through post injection in an in-cylinder fuel injection, direct fuel injection in an exhaust pipe or the like.

The air-fuel ratio of the exhaust-gas herein does not necessarily mean the condition of the air-fuel ratio in a cylinder but refers to a ratio between an air amount and a fuel amount (including those burned in the cylinder) supplied into the exhaust-gas flowing into the exhaust-gas after-treatment device.

When cerium oxide IV ($CeO_2$) is employed as an oxygen storage capacitor substance, Ce becomes trivalent cerium oxide III ($Ce_2O_3$) by the reaction of $CeO_2 \rightarrow (½)Ce_2O_3+(¼)O_2$, and cerium oxide IV is reduced. This reaction is an endothermic reaction, and the heat of $\Delta H=191$ kJ/mol is absorbed. On the other hand, when the condition is switched to the lean condition (oxidized atmosphere), Ce returns to quadrivalent cerium oxide IV ($CeO_2$) by the reaction of $(½)Ce_2O_3+(¼)O_2 \rightarrow CeO_2$, and cerium oxide III is oxidized. This reaction is an exothermic reaction, and the heat of $\Delta H=-191$ kJ/mol is generated. These reactions are reversible.

And in the rich condition, the heat more than absorbed is generated by the oxidation reaction (burning) of the oxygen released at the oxygen storage capacitor substance and a reducing agent, and the oxidation reaction heat of the reducing agent is utilized. Since the oxygen (O) released at the endothermic reaction at this reduction contains radical oxygen, the reducing agent such as HC, CO, $H_2$ and the like in the exhaust-gas in the rich condition can be burned extremely efficiently. Therefore, the heat absorption generated by the oxygen release reaction is offset and the temperature can be raised. In the lean condition, the reaction heat of the oxygen reaction at absorption of oxygen by the oxygen storage capacitor substance is utilized. In this case, the temperature is raised by self-heating. Therefore, the heat amount exceeds as a whole and the temperature is raised.

By actively utilizing the heat generated at switching from the rich condition to the lean condition, the temperature of the catalyst surface carrying the oxygen storage capacitor substance of the exhaust-gas after-treatment device is raised, by which the exhaust-gas purification rate can be improved.

Alternatively, by actively utilizing the heat generated at switching form the rich condition to the lean condition, the temperature of the carrier of the oxygen storage capacitor substance arranged on the upstream side of the deNOx catalyst and the DPF is raised so as to raise the temperature of the exhaust-gas flowing into the deNOx catalyst and the DPF, by which the exhaust-gas purification rate can be improved.

The exothermal reaction occurring at switching from the rich condition to the lean condition progresses gently in a gasoline engine since the oxygen amount in the exhaust-gas is small. However, in a lean-burning gasoline engine or diesel engine, the reaction progresses rapidly since the oxygen amount in the exhaust-gas is large. Thus, by self-heating of the oxygen storage capacitor substance such as $CeO_2$ or the like, the surface temperature of the catalyst or carrier can be easily raised, for example, by approximately 60° C.

This temperature raising is carried out when the temperature of the exhaust-gas is lower than a given temperature, that is, when the temperature of the exhaust-gas is low, the temperature of the catalyst such as the deNOx catalyst, the oxidation catalyst of the continuous regeneration type DPF, PM oxidation catalyst or the like is low and the activity of the catalyst is low. By this, the catalysts are activated, and the NOx reduction rate and PM self-burning rate are improved. The given temperature is set to a temperature at which the catalysts are not activated when the exhaust-gas temperature is lower than this given temperature, that is, the temperature requiring temperature raising action (for example, 300° C.).

It may be determined whether the exhaust-gas temperature is lower than the given temperature by a temperature sensor of the exhaust-gas, but whether the exhaust-gas temperature is lower than the given temperature may be determined based on whether the catalyst temperature is lower than the given temperature by a catalyst temperature sensor. In the present invention, since the objective is to raise the temperature of the catalyst for activation, the determination is preferably made based on whether the catalyst temperature is lower than the given temperature (activation temperature), but since measuring the catalyst temperature is generally difficult, the exhaust-gas temperature or the like is used instead. When the temperature of the exhaust-gas is lower than the given temperature, it is a case of idling or a low-load driving, and the determination on whether the exhaust-gas temperature is lower than the given temperature may be estimated from an index indicating, for example, the engine condition such as an engine speed or load.

Also, at the NOx catalyst regeneration operation for restoring the NOx absorption capability of the NOx absorption catalyst, at the NOx catalyst regeneration operation for regenerating an active substance of the NOx direct reduction type catalyst, or at the DPF regeneration operation for forcedly burning and eliminating PM collected by the DPF, the exothermal reaction occurring at switching from the rich condition to the lean condition can be utilized by repeating the switching from the rich condition to the lean condition. Therefore, great contribution can be made to raising the exhaust-gas temperature to as high as 500° C. or above.

When a substance containing cerium element is used as the oxygen storage capacitor substance, the heat generated by the oxidation reaction of $2Ce_2O_3+O_2->4CeO_2$ can be used. This cerium has a large oxygen storage capacitor capacity, and a great effect can be exerted.

This rich condition is 1.1 to 0.8 in the air excess ratio ($\lambda$) equivalent, while the lean condition is 1.8 to 1.0 in the air excess ratio ($\lambda$) equivalent. However, the lean-condition period is made smaller than the rich-condition period. Moreover, it is preferable that the rich condition is 1.0 to 0.8 in the air excess ratio ($\lambda$) equivalent, while the lean condition is 1.1 to 1.0 in the air excess ratio ($\lambda$) equivalent. However, even in this case, the lean-condition period is made smaller than the rich-condition period.

When the ratio of rich condition (R):lean condition (L) is changed, the heat generation amount is changed accordingly. The heat generation amount is partially influenced by a remaining amount of the reducing agent such as HC but also caused by the oxygen amount in the oxygen storage capacitor substance influenced by the air excess ratio $\lambda$. That is, if the rich condition period becomes longer, the richness in the oxygen storage capacitor substance gets higher. That is because the oxygen amount to be released becomes large and the oxidation reaction occurs strongly by this.

As a preferable ratio between the rich condition (R)/lean condition (L) of 3/57 to 3/3 is obtained experimentally. Therefore, the ratio of time period in the rich condition and in the lean condition is set to rich condition (R):lean condition (L)=3:57 to 3:3. By this, the temperature in the exhaust-gas after-treatment device can be efficiently raised in the relation between the fuel consumption and the degree of raising temperature to achieve the rich condition.

Also, the exhaust-gas after-treatment device is configured to be formed by a wall-through type honeycomb structure and to form an oxygen storage capacitor substance layer of a substance containing cerium element on the surface side on the upstream-side wall surface of the wall-through type honeycomb structure (upstream side). By this configuration, $O_2$ in the exhaust-gas is brought into contact with the oxygen storage capacitor substance layer at first and occluded in the oxygen storage capacitor substance. Therefore, the exothermal effect by this absorption reaction can be efficiently utilized. And by the heat generation of the oxygen storage capacitor substance layer and temperature rise, the temperature of the honeycomb structure can be raised, and the collected PM can be self-burned and eliminated.

Also, an oxidation catalyst layer of platinum/aluminum oxide is formed on the wall surface side (upstream side) of the downstream-side wall surface of the wall-through type honeycomb structure, and a NOx direct reduction type catalyst such as rhodium/ceria (cerium oxide:$CeO_2$) and a Lean NOx trap catalyst such as barium (or potassium)/ceria is formed on the surface side (downstream side). By this configuration, the reducing agent in the exhaust-gas rich condition can be oxidized by the oxidation catalyst layer. Therefore, the temperature of the honeycomb structure and the deNOx catalyst layer can be raised by the oxidation reaction heat, and self-burning of the collected PM and NOx reduction can be promoted.

Also, on the surface side (more upstream side) of the oxygen storage capacitor substance layer provided on the surface side of the upstream-side wall surface of the wall-through type honeycomb structure (upstream side), an oxidation catalyst layer such as platinum/aluminum oxide is formed. By this configuration, the oxidation reaction heat can be utilized in the rich condition by oxidizing the reducing agent, while the reaction heat can be utilized in the lean condition by absorbing oxygen.

Moreover, in the oxygen storage capacitor substance layer or in the carrier for carrying the oxygen storage capacitor substance, by setting the carrying amount of the substance containing cerium element to 50 g/L to 200 g/L or preferably at 150 g/L, the heat can be efficiently generated. If the amount is less than 50 g/L, the heat generation amount is small and the effect is low, while if the amount is exceeded 200 g/L, saturation occurs. This carrying amount is obtained by dividing the carrying amount (mass) of the substance containing cerium element by the volume (L: liter) of the entire outer shape of the honeycomb structure.

Since PM oxidation and NOx reduction can be carried out at the same time by integrating the structure for DPF and the structure of NOx catalyst carrying by the configuration of this wall-through type honeycomb structure, there is no need to arrange two casings for a NOx catalyst and a DPF with catalyst any more in the exhaust-gas after-treatment device. By this, the exhaust-gas after-treatment device can be made compact, and restriction on mounting onboard can be reduced. Also, since the oxygen storage capacitor substance layer to be the exothermal source can be arranged in an extreme vicinity such as within the catalyst layer of the DPF or the deNOx catalyst or within an adjacent layer, the temperature of the DPF and the deNOx catalyst can be efficiently raised.

If the exhaust-gas after-treatment device is provided with at least one of the deNOx catalyst and the DPF, the improvement of the NOx reduction rate by activating the deNOx catalyst and the improvement of active self-burning of PM by activating the oxidation catalyst of the continuous regeneration type DPF and the PM oxidation catalyst can be accelerated particularly by raising the temperature of the carrier or the temperature of an exhaust-gas raised by the temperature rise of the carrier.

According to a method of raising exhaust-gas temperature in an exhaust-gas after-treatment device and an exhaust-gas after-treatment system according to the present invention, in the exhaust-gas after-treatment system provided with the deNOx catalyst or/and the DPF, when the temperature of the exhaust-gas is not higher than a given temperature at a time other than regeneration control of the exhaust-gas after-treatment device such as the NOx catalyst regeneration and the DPF regeneration, by bringing the air-fuel ratio of the exhaust-gas into the lean condition and the rich condition repeatedly, that is, by repeating the lean/rich cycle, the temperature in the exhaust-gas after-treatment device can be raised utilizing the self-heating action at oxygen absorption of the oxygen storage capacitor substance. Alternatively, the temperature of the carrier can be raised utilizing the self-heating action, by which the temperature of the exhaust-gas passing through the carrier can be raised.

And by such temperature raising, even in the driving condition where the temperature of the exhaust-gas is low such as idling driving and low-load driving, NOx and PM purification rates can be improved. Moreover, when both the deNOx catalyst and the DPF are provided, reactions of both NOx reduction and PM oxidation can be promoted at the same time, by which the purification rates can be improved.

If the carrier of the oxygen storage capacitor substance is formed separately from the exhaust-gas after-treatment device, only by additionally providing the carrier at an exhaust passage, the purification performance of the already installed exhaust-gas after-treatment device can be improved when the exhaust-gas temperature is low.

DETAILED DESCRIPTION OF THE EMBODIMENTS

A method of raising exhaust-gas temperature in an exhaust-gas after-treatment device (an exhaust-gas purifier) and an exhaust-gas after-treatment system (an exhaust-gas purification system) of embodiments according to the present invention will be described below referring to the attached drawings. The air-fuel ratio of the exhaust-gas herein does not necessarily mean the condition of the air-fuel ratio in a cylinder but a ratio between an air amount and a fuel amount (including that burned in the cylinder) supplied into the exhaust-gas flowing into the exhaust-gas after-treatment device.

Figure 1:
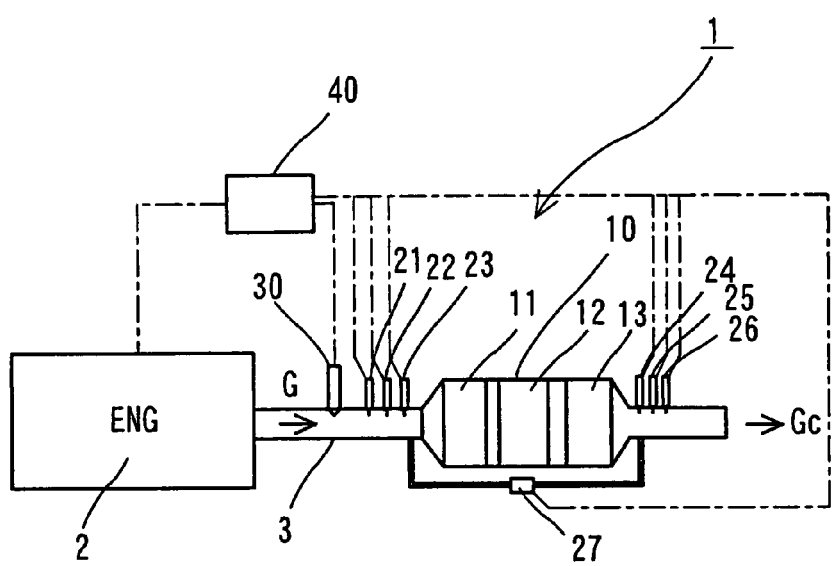
FIG. 1 is a view illustrating a configuration of an exhaust-gas after-treatment system of a first embodiment according to the present invention.

First, the exhaust-gas after-treatment system of a first embodiment according to the present invention will be described. FIG. 1 shows a configuration of an exhaust-gas after-treatment system 1 of the first embodiment. This exhaust-gas after-treatment system 1 includes an exhaust-gas after-treatment device 10 arranged in an exhaust passage 3 of an engine (internal combustion engine) 2. This exhaust-gas after-treatment device 10 is configured to have an oxidation catalyst 11, a DPF (diesel particulate filter) 12 and a deNOx catalyst 13 in the order from the upstream side in the first embodiment.

The oxidation catalyst 11 is formed from a monolith catalyst having a large number of polygonal cells. This monolith catalyst is formed from a structural material such as cordierite, silicon carbide (SiC), stainless or the like. On the inner wall of this cell, a catalyst coat layer taking a surface area is provided. On the large surface of the catalyst coat layer, catalyst metal such as platinum (Pt) and palladium (Pd) is carried.

This oxidation catalyst 11 oxidizes a reducing agent such as HC, CO in the exhaust-gas and raises the exhaust-gas temperature by heat generated by this oxidation reaction. Alternatively, the oxidation catalyst 11 oxidizes NO in the exhaust-gas so as to generate $NO_2$ and promote oxidation of PM collected at the DPF 12 by this $NO_2$.

The DPF 12 is formed from a monolith wall-through type filter or the like in which an inlet and an outlet of a porous ceramic honeycomb channel are alternately sealed. This DPF 12 collects to eliminate PM in an exhaust-gas G. In order to promote burning and elimination of PM, the DPF 12 may be coated with a catalyst layer carrying an oxidation catalyst or PM oxidation catalyst.

Also, the deNOx catalyst 13 is formed, for example, from a lean NOx trap catalyst or a NOx direct reduction type catalyst. The lean NOx trap catalyst is formed from a monolith catalyst. And a catalyst coat layer is provided at the carrier such as aluminum oxide, titanium oxide and the like. The catalyst coat layer carries a catalyst metal such as platinum (Pt) and palladium (Pd), and NOx absorption material (NOx absorption substance) such as barium (Ba).

In this lean NOx trap catalyst, NOx in the exhaust-gas G is absorbed in the NOx absorption material when the exhaust-gas condition is high in the oxygen concentration (lean air-fuel ratio condition). Also, in the exhaust-gas condition where the oxygen concentration is low or zero, the occluded NOx is released and the released NOx is reduced by a catalytic action of the catalyst metal. By this, the purified exhaust-gas Gc is made, and NOx is prevented from flowing out to the atmosphere.

The NOx direct reduction type catalyst (DCR) is a catalyst for directly reducing NOx. In this catalyst, metal, which is a catalyst component such as rhodium (Rh) and palladium (Pd), is carried on a catalyst carrier such as β zeolite, for example. Moreover, the following is carried out. Cerium (Ce) contributing to reducing the oxidation action of these metals and to maintaining the NOx reduction capability is mixed. In order to promote the oxidation/reduction reaction, the reduction reaction of NOx particularly in the rich condition, a three-way catalyst is provided at a lower layer. In order to improve the NOx reduction rate, iron (Fe) is added to the carrier.

This NOx direct reduction type catalyst directly reduces NOx to $N_2$ in the lean condition. At this reduction, $O_2$ is adsorbed to the metal, which is an active substance of the catalyst, and the reduction performance is lowered. Therefore, when the NOx reduction capability gets close to saturation, rich control for restoring the NOx reduction capability is carried out. In this rich control, the air-fuel ratio of the exhaust-gas G is brought into the rich condition so that the oxygen concentration in the inflow exhaust-gas G is lowered. By this, the $O_2$ adsorbed from the active substance of the catalyst is released, by which the active substance is regenerated.

Figure 2:
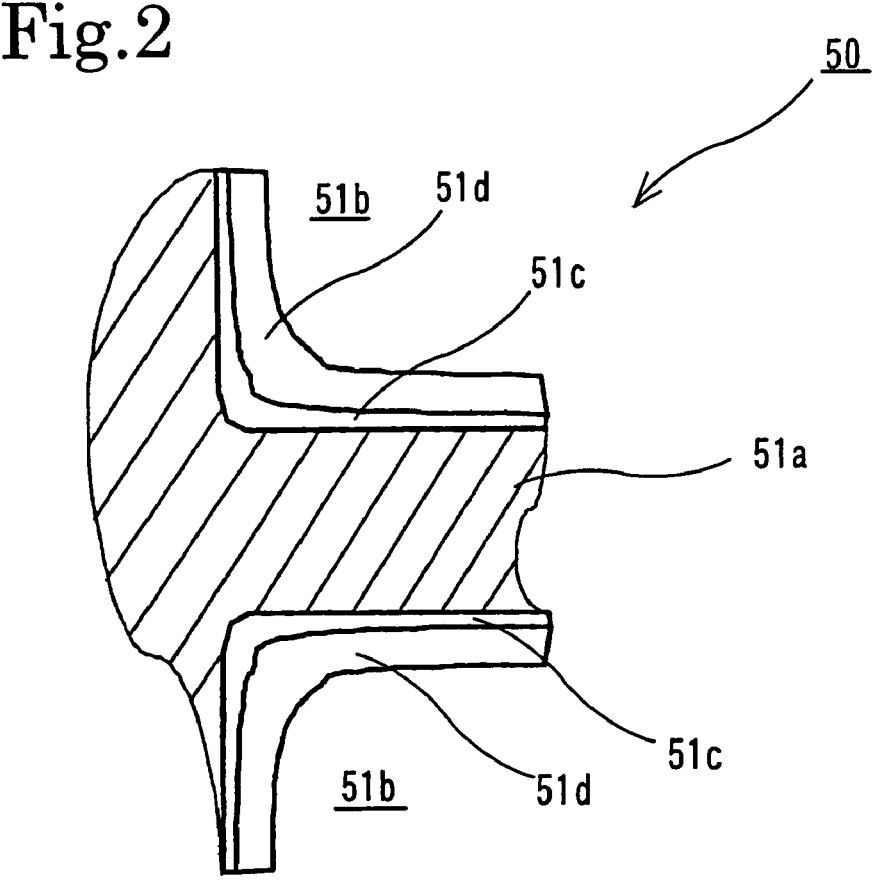
FIG. 2 is a partially enlarged sectional view illustrating a configuration of a catalyst of the first embodiment according to the present invention.

A partially enlarged view of a catalyst 50 such as this deNOx catalyst 13 is shown in FIG. 2. In the catalyst structure, a large number of cells 51b partitioned by a cordierite honeycomb 51a are formed. This cell 51b becomes a passage for the exhaust-gas. A catalyst first layer 51c is provided at a portion faced with this cell 51b, and a catalyst second layer 51d is provided on its surface. In the oxidation catalyst 11, the catalyst first layer 51c is formed from aluminum oxide and platinum, which is a coating agent, and the catalyst second layer 51d is not provided.

And in the lean NOx trap catalyst, the catalyst first layer 51c is formed from aluminum oxide, which is a coating agent, and platinum, which is an oxidation catalyst, while the catalyst second layer 51d is formed from aluminum oxide, which is a coating agent, and barium (Ba) and potassium (K), which are NOx absorption substances.

In the NOx direct reduction type catalyst, the catalyst first layer 51c is formed from aluminum oxide, which is a coating agent, and platinum, which is an oxidation catalyst, while the catalyst second layer 51d is formed from aluminum oxide, which is a coating agent, and rhodium (Rh), which is a direct reduction type catalyst.

And at least part of the oxidation catalyst 11, the DPF 12 and the deNOx catalyst 13, preferably on the catalyst on the upstream side is configured to comprise an oxygen storage capacitor substance having the following nature. The oxygen storage capacitor substance is a substance having a nature of releasing oxygen ($O_2$) when the exhaust-gas G is in the rich condition and absorbing oxygen and generating heat in the lean condition. The oxygen storage capacitor substances include a substance containing cerium (Ce), which is a base metal. This substance is carried by the catalyst first layer 51c and the catalyst second layer 51d in FIG. 2.

Moreover, as shown in FIG. 1, in the exhaust passage 3 on the upstream side of the exhaust-gas after-treatment device 10, an HC supply valve (fuel injection injector) 30 for supplying hydrocarbon (HC) to be a reducing agent of NOx is provided. This HC supply valve 30 directly injects hydrocarbon (HC) such as light oil, which is a fuel of an engine from a fuel tank, not shown, into the exhaust passage 3 so as to bring the air-fuel ratio of the exhaust-gas G into the rich condition or stoichiometric condition (theoretical air-fuel ratio condition). In the case of air-fuel ratio control by post-injection in the fuel injection in the cylinder of the engine 2, this HC supply valve 30 can be omitted.

Also, as shown in FIG. 1, on the upstream side of this exhaust-gas after-treatment device 10, an upstream-side exhaust temperature sensor 21, an upstream-side NOx concentration sensor 22, and an upstream-side λ sensor 23 are provided. Also, on the downstream side of the exhaust-gas after-treatment device 10, a downstream-side exhaust temperature sensor 24, a downstream-side NOx concentration sensor 25, and a downstream-side $O_2$ sensor 26 are provided. Moreover, a differential pressure sensor 27 for monitoring a clogged state of the DPF 12 is provided.

Furthermore, as shown in FIG. 1, a control unit (ECU: engine control unit) 40 is provided. This control unit 40 controls general operation of the engine 2 and also carries out restoring control of the NOx reduction capability of the deNOx catalyst 13. Detected values of the sensors 21 to 27 and the like are input in this control unit 40. From this control unit 40, a signal for controlling an EGR valve as well as a fuel injection valve and an intake throttle valve of a common-rail electronically controlled fuel injection device for fuel injection in the engine 2 are output.

This control unit 40 carries out the control of the exhaust-gas after-treatment system 1 in parallel with the driving control of the engine 2. This control unit 40 carries out various controls of the exhaust-gas after-treatment system 1 such as PM regeneration control for eliminating PM collected by the DPF 12, NOx regeneration control for restoring the NOx absorption capability of the deNOx catalyst 13, sulfur-purge control for restoring sulfur poisoning of the deNOx catalyst.

In the PM regeneration control, when an accumulated amount of PM in the DPF 12 is increased and the clogged state is worsened, the following control is carried out. The EGR amount is increased by controlling the EGR valve or a new intake amount is decreased by controlling the intake throttle valve. By this, the temperature of the exhaust-gas G is raised. Also, the fuel into the exhaust-gas G is added by injection into the exhaust pipe by the HC supply valve 30 or post-injection in the in-cylinder injection. This fuel is oxidized by the oxidation catalyst 11, and utilizing the heat by this oxidation reaction, the temperature of the exhaust-gas G is raised. Utilizing this temperature rise, the PM collected by the DPF 12 is oxidized to be eliminated. Also, at oxidation of the PM, $NO_2$ generated by the oxidation reaction of NO in the exhaust-gas G is utilized.

In the NOx regeneration control for the deNOx catalyst 13, the NOx reduction rate is calculated from the NOx concentration detected by the NOx concentration sensors 22 and 25 arranged on the upstream side and the downstream side of the deNOx catalyst 13. When the NOx reduction rate drops below a given determined value, regeneration of the NOx catalyst is started. Alternatively, a discharge amount $\Delta NOx$ of NOx per unit time is calculated from the engine driving condition. When NOx accumulated value $\Sigma NOx$ calculated by accumulative calculation of this $\Delta NOx$ exceeds a given determined value Cn, regeneration is started.

And the air-fuel ratio of the exhaust-gas G is controlled to a stoichiometric air-fuel ratio (theoretical air-fuel ratio) or a rich condition. In this control, either or both of the following controls are carried out to lower the air-fuel ratio of the exhaust-gas G. The EGR amount is increased by controlling the EGR valve or a new-air intake amount is decreased by controlling the intake throttle valve. Fuel is added to the exhaust-gas G by injection in the exhaust pipe by the HC supply valve 30 or by post injection in the in-cylinder injection.

By these controls, the condition of the exhaust-gas G is brought into a given target air-fuel ratio condition and within a given temperature range (though depending on the catalyst, approximately 200° C. to 600° C.). By this, the NOx reduction capability is restored and the NOx catalyst is regenerated.

The sulfur-purge control of the deNOx catalyst 13 is carried out as follows. A sulfur accumulated amount is calculated. When this sulfur accumulated amount exceeds a determined value, it is considered that the sulfur has been accumulated to the level that the NOx absorption capability is lowered, and sulfur-purge control is started. Though depending on the catalyst, sulfate salt is dissolved to be released only in a rich condition of approximately 600° C. to 700° C. Therefore, in this sulfur-purge control, PM regeneration control of the DPF 12 is carried out prior to the sulfur-purge control in view of efficient energy operation so that the temperatures of the exhaust-gas G and the deNOx catalyst 13 are raised by PM burning.

And the control unit 40 is configured to have the following temperature-raising control means. This temperature-raising control means carries out temperature-raising control repeating the rich condition (R) and the lean condition (L) of the exhaust-gas G when the temperature (exhaust temperature) Tg of the exhaust-gas G is not higher than the given temperature (for example, 300° C.) even at a time other than the regeneration control of the exhaust-gas after-treatment device 10 such as the above DPF regeneration control, NOx catalyst regeneration control, sulfur-purge control and the like. This given temperature is a temperature below which each catalyst is not activated.

By this temperature-raising control, when the exhaust-gas G is in the rich condition, the reducing agent in the exhaust-gas G is oxidized by oxygen released from the oxygen storage capacitor substance. By this oxidation, the oxygen storage capacitor substance generates oxidation heat exceeding the heat absorption amount at oxygen release and raises the temperature of the catalyst provided with the oxygen storage capacitor substance. Also, by this temperature-raising control, when the exhaust-gas G is in the lean condition, by the heat generated at occluding the oxygen in the exhaust-gas G by the oxygen storage capacitor substance, the temperature of the catalyst provided with the oxygen absorption substance is raised.

And by this temperature rise of the catalyst, the temperature of each catalyst is raised above the activation temperature. By activation caused by this temperature rise, the oxidation/elimination of PM and reduction performance of NOx are improved when the temperature of the exhaust-gas G is low at a time other than regeneration control of the exhaust-gas after-treatment device 10.

In this temperature-raising control of the exhaust-gas after-treatment device 10, the rich condition and the lean condition are repeated. In the rich condition, the air-fuel ratio on the inlet side of the exhaust-gas after-treatment device 10 is brought to the rich side of $\lambda R=1.1$ to 0.8 in the air excess ratio equivalent. For that purpose, the reducing agent is supplied into the exhaust-gas G by injection in the exhaust pipe or post injection, and the control to create a rich atmosphere is carried out for a given time period.

And after the rich condition lasts for the given time period, the condition is brought to the lean one. In this lean condition, the injection in the exhaust pipe or post injection is stopped, and a control is carried out to bring it to the lean side of $\lambda L=1.8$ to 1.0 (however, $\lambda R<\lambda L$) in the air excess ratio equivalent. These controls are alternately repeated. The effect is large in the case of $\lambda R=1.0$ to 0.8 and $\lambda L=1.8$ to 1.0 (however, $\lambda R<\lambda L$).

This air-fuel ratio control of the exhaust-gas G is carried out by adjustment control of the amount of the reducing agent to be supplied into the exhaust-gas G so that an output value of the upstream-side air excess ratio sensor 23 on the inlet side of the exhaust-gas after-treatment device 10 becomes the respective target air excess ratios $\lambda R$, $\lambda L$. For this air-fuel ratio on the inlet side, an air-fuel ratio calculated from the intake amount and a load (fuel injection amount) can be used instead of the output value of the upstream-side air excess ratio sensor 23.

And in this temperature-raising control, the time ratio between the control to bring it to the rich air-fuel ratio and the control to bring it to the lean air-fuel ratio is set to rich-side control (R):lean-side control (L)=R:L=3:57 to 3:3. With regard to the time period per cycle for the control to the rich air-fuel ratio and the control to the lean air-fuel ratio, the time for control to the rich side is approximately 3 s to 5 s, while the time for control to the lean side is approximately 3 s to 60 s, 1 to 57/3 times of that. This rich/lean cycle is carried out for the time when temperature rise of the catalyst is needed.

Figure 7:
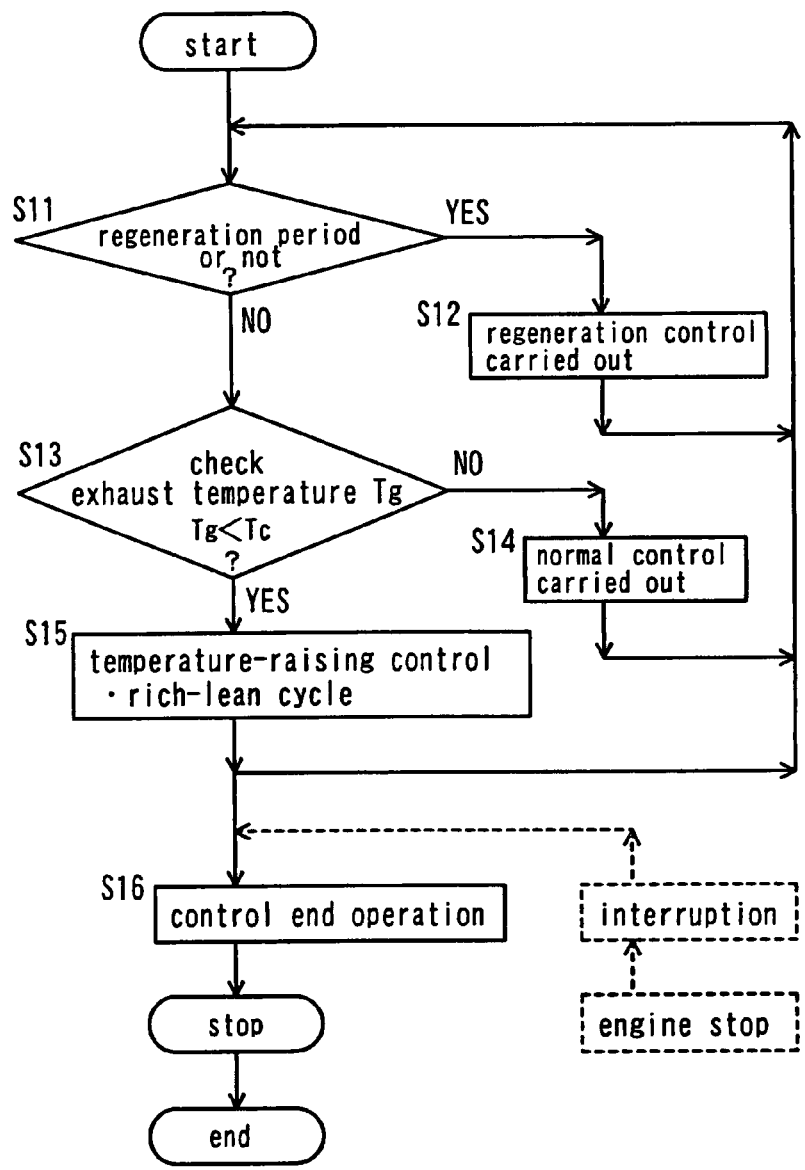
FIG. 7 is a view illustrating an example of a control flow of the exhaust-gas after-treatment system according to the present invention.

FIG. 7 shows an example of a control flow of the exhaust-gas after-treatment system 1 including this temperature-raising control. In this control flow, at Step S11, whether it is the regeneration timing or period of the exhaust-gas after-treatment device 10 is determined. This regeneration timing includes the regeneration timing of the DPF 12, regeneration timing of the deNOx catalyst, and regeneration (sulfur-purge) timing from sulfur poisoning.

If it is determined as regeneration timing at Step S11, the routine goes to step S12, where respective regeneration controls are carried out, and the routine returns to Step S11. For the determination of the regeneration timing and regeneration control, conventional arts can be used. If it is determined not to be the regeneration timing, the routine goes on to Step S13.

At Step S13, it is determined whether the exhaust-gas temperature (temperature of the exhaust-gas) Tg is lower than a given temperature Tc. If it is higher, the normal control executing the normal engine driving is carried out for a given time at Step S14, and the routine returns to the control Step S11. This given time is a time relating to an interval in carrying out determination of the regeneration timing and check of the exhaust temperature. On the other hand, if it is lower, the routine goes to Step S15, where the temperature-raising control of rich/lean cycle is carried out for 1 to several cycles and then, the routine returns to Step S11. The rich/lean cycle is comprised of the rich control to bring it to the rich condition (R) for a given rich continued time (for example, 3 s to 5 s) and the lean control to bring it to the lean condition (L) for a given rich continued time (for example, 3s to 60 s).

Step S11 to step S15 are repeated until the engine stops. When the engine is stopped, interruption occurs, a control end operation at step S16 is carried out, and the control is stopped and ended.

By this control flow, the temperature-raising control repeating the rich condition (R) and the lean condition (L) of the exhaust-gas G can be carried out when the temperature Tg of the exhaust-gas G is not higher than the given temperature Tc even at a time other than the regeneration timing of the exhaust-gas after-treatment device 10.

Figure 3:
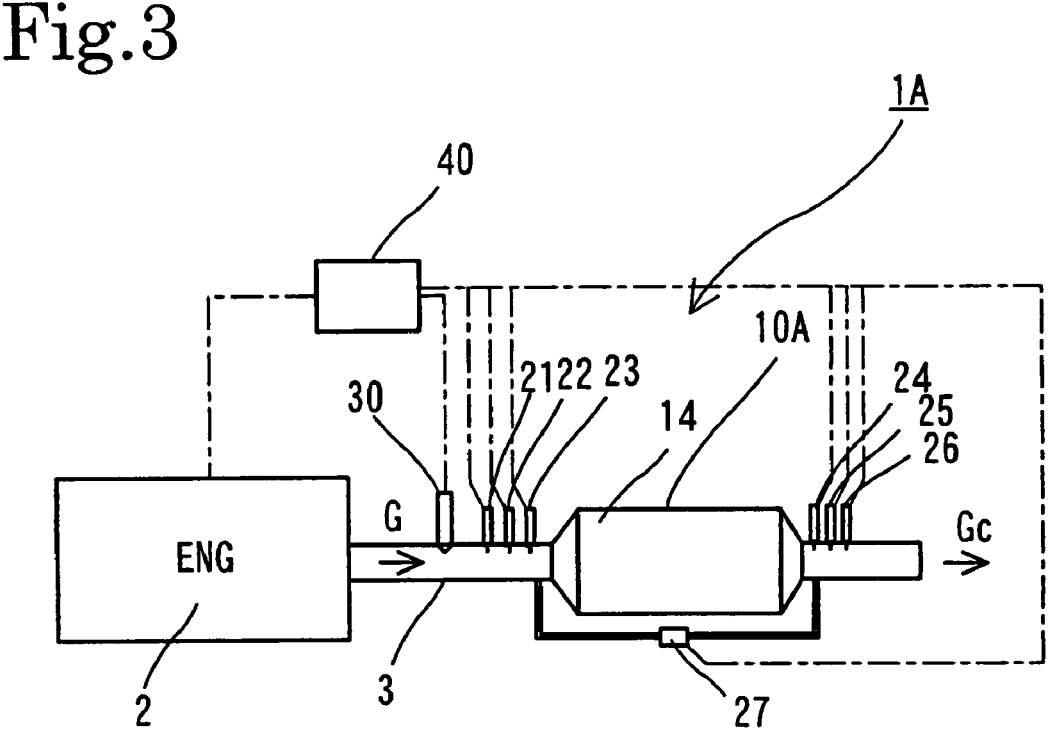
FIG. 3 is a view illustrating a configuration of an exhaust-gas after-treatment system of the second embodiment according to the present invention.

Next, the exhaust-gas after-treatment system of a second embodiment according to the present invention will be described. FIG. 3 shows configuration of an exhaust-gas after-treatment system 1A of the second embodiment. This exhaust-gas after-treatment system 1A is configured to arrange an exhaust-gas after-treatment device 10A in the exhaust passage 3 of the engine (internal combustion engine) 2.

In this second embodiment, the exhaust-gas after-treatment device 10A is configured to comprise a DPF 14 with a catalyst having a NOx reduction function as well as the PM collecting function instead of the exhaust-gas after-treatment device 10 of the first embodiment. The other configurations are the same as those in the first embodiment.

Figure 4:
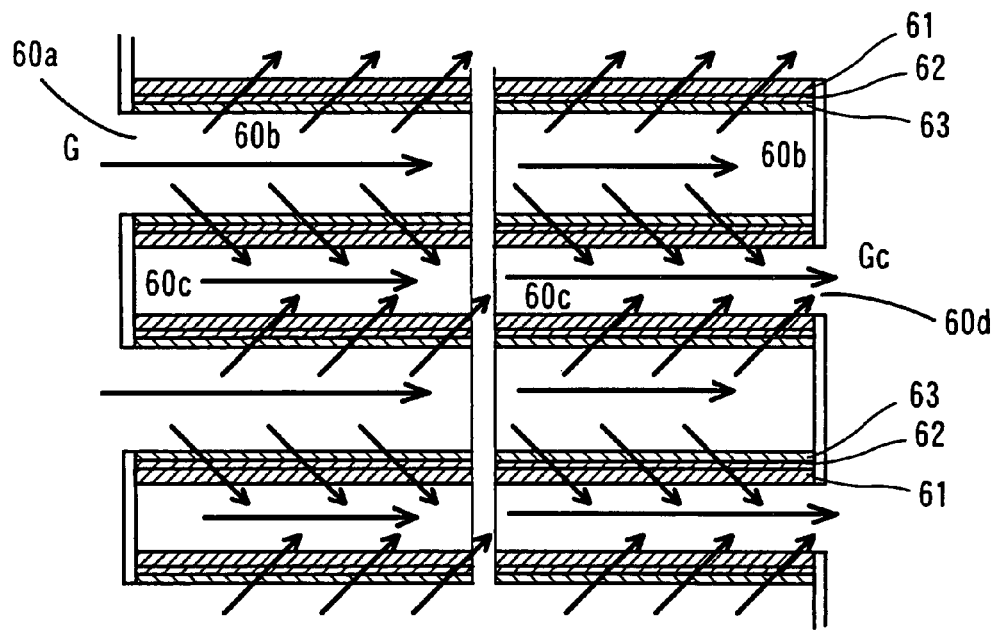
FIG. 4 is a view illustrating a configuration of a DPF of a second embodiment according to the present invention.

This DPF 14 is, as shown in FIG. 4, formed from a monolith honeycomb wall-through type filter in which an inlet and an outlet of a porous ceramic honeycomb channel are alternately sealed. In this filter, the surface side of the upstream-side wall surface of a porous wall 61, that is, on the upstream side of a gas flow, an oxygen storage capacitor substance layer 62 carrying an oxygen storage capacitor substance with the following nature is provided. This oxygen storage capacitor substance releases oxygen when the exhaust-gas G is in the rich condition, while it stores oxygen and generates heat in the lean condition. Moreover, on its surface side, that is, on the upstream side of the gas flow, an oxidation catalyst layer 63 of platinum/aluminum oxide is provided.

Figure 5:
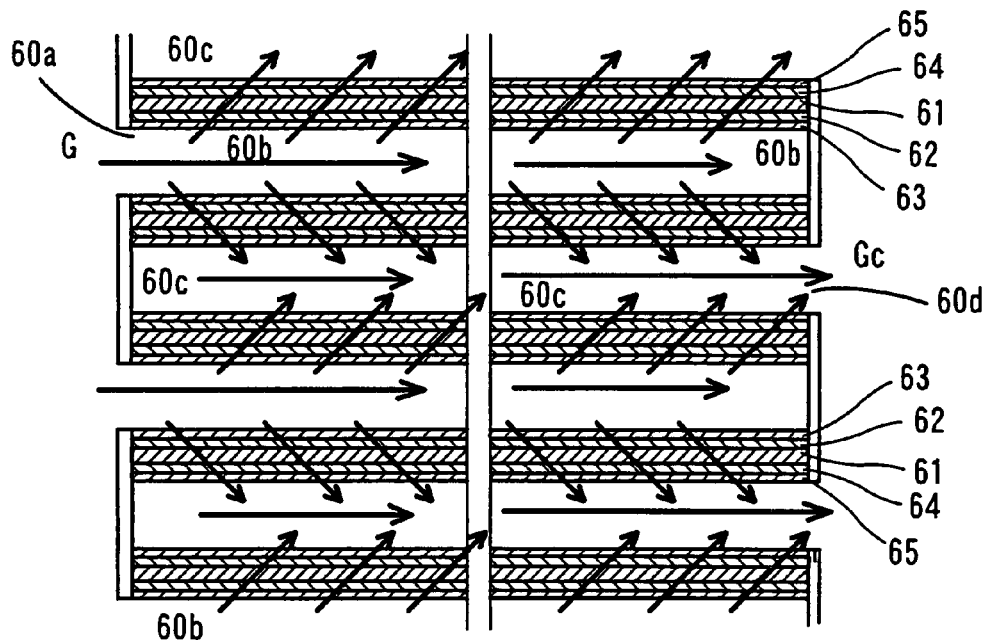
FIG. 5 is a view illustrating another configuration of a DPF of the second embodiment according to the present invention.

Alternatively, as shown in FIG. 5, in addition to the configuration in FIG. 4, furthermore, on the wall surface side of the downstream-side wall surface, that is, on the upstream side of the gas flow, an oxidation catalyst layer 64 of platinum/aluminum oxide is provided. Moreover, on its surface side, that is, on the downstream side of the gas flow, a deNOx catalyst layer 65 such as rhodium (Rh)/ceria ($CeO_2$) is provided.

This deNOx catalyst layer 65 uses rhodium/ceria and the like in the case of the NOx direct reduction type catalyst, but it uses barium (Ba)/aluminum oxide instead in the case of the lean NOx trap catalyst.

By this configuration, the exhaust-gas G flowing into the exhaust-gas after-treatment device 10A flows from an inlet 60a of the DPF 14 with catalyst into an upstream-side passage 60b, passes through the upstream-side passage 60b and touches the oxidation catalyst layer 63 and the oxidation storage capacitor substance layer 62 on the upstream-side wall surface. The exhaust-gas G enters a downstream-side passage 60c after passing through the porous wall 61 of a carrier base. The exhaust-gas G touches the oxidation catalyst layer 64 and the deNOx catalyst layer 65 on the downstream-side wall surface while passing through the downstream-side passage 60c. After that, the exhaust-gas G is released as a purified gas Gc from an outlet 60d.

In the oxidation catalyst layer 63 and the oxygen storage capacitor substance layer 62 of the DPF 14 with catalyst, the reducing agent in the exhaust-gas G is oxidized, and heat is generated by this oxidation reaction. Also, in the porous wall 61, PM in the exhaust-gas G is collected. The oxidation catalyst layer 64 and the deNOx catalyst layer 65 reduce NOx. In this NOx reduction, NOx is reduced by the catalyst layers 64 and 65 on the downstream-side wall surface in the lean condition, while rhodium oxide generated by oxidizing rhodium at NOx reduction is reduced in the rich condition.

And, by oxidation reaction of the reducing agent in the oxidation catalyst layer 63 and the oxygen storage capacitor substance layer 62 when the exhaust-gas G is in the rich condition, and by reaction heat absorbing oxygen in the oxygen storage capacitor substance layer 62 when the exhaust-gas G is switched from the rich condition (R) to the lean condition (L), the temperatures of the oxidation catalyst layer 63, the porous wall 61, the oxidation catalyst layer 64, and the deNOx catalyst layer 65 are raised and thereby they are activated. By this, self-burning of the collected PM is promoted and the NOx reduction rate is improved.

Figure 6:
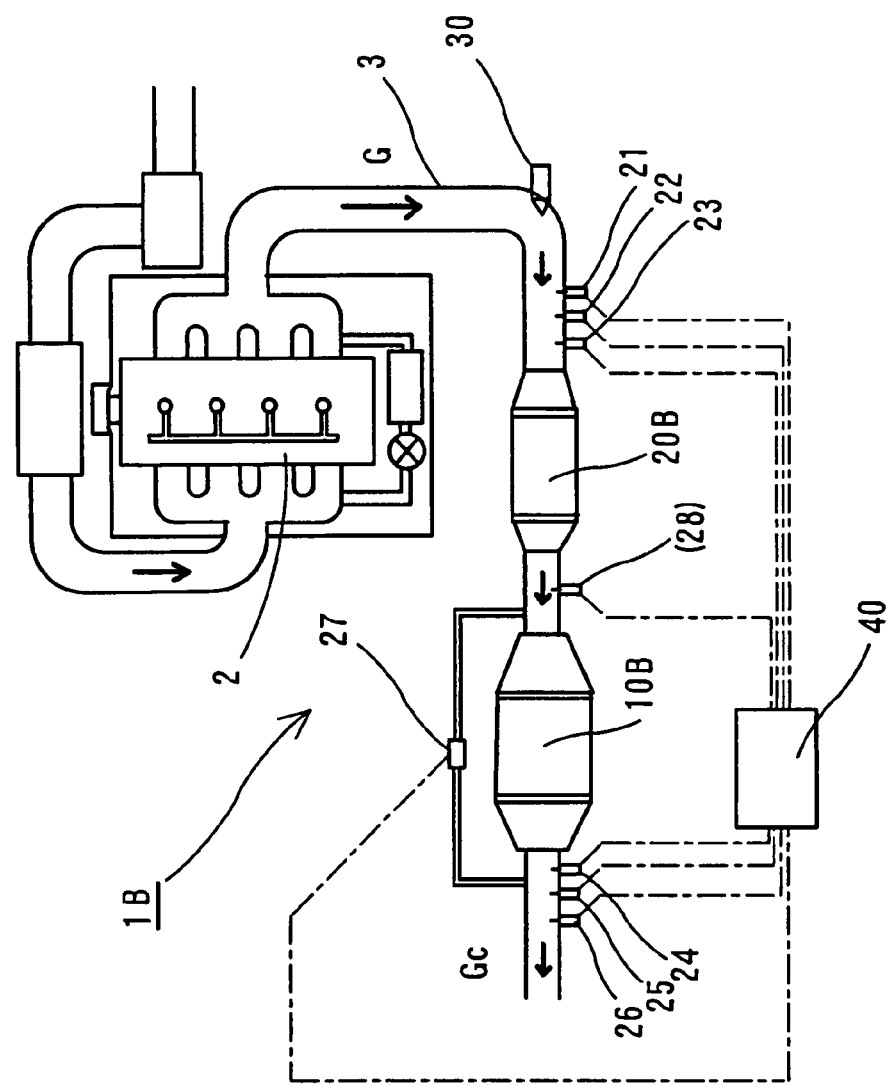
FIG. 6 is view illustrating a configuration of an exhaust-gas after-treatment system of a third embodiment according to the present invention.

Next, an exhaust-gas after-treatment system of a third embodiment according to the present invention will be described. FIG. 6 shows configuration of an exhaust-gas after-treatment system 1B of the third embodiment. This exhaust-gas after-treatment system 1B is configured to arrange an exhaust-gas after-treatment device 10B in the exhaust passage 3 of the engine (internal combustion engine) 2. This exhaust-gas after-treatment device 10B is configured to include one of or both of the deNOx catalyst and the DPF (diesel particulate filter).

The deNOx catalyst is formed, for example, from a lean NOx trap catalyst or a NOx direct reduction type catalyst. This lean NOx trap catalyst and NOx direct reduction type catalyst are the same as those described in the first embodiment.

And in the case of the continuous regeneration DPF, it may include the upstream-side oxidation catalyst and the downstream-side DPF or the downstream-side DPF with catalyst. The oxidation catalyst and the DPF are the same as those described in the first embodiment.

And in the third embodiment, on the upstream side of this exhaust-gas after-treatment device 10B, a carrier (catalyst converter) 20B carrying an oxygen storage capacitor substance which releases oxygen ($O_2$) when the exhaust-gas G is in the rich condition and which storages oxygen and generates heat in the lean condition is provided. The oxygen storage capacitor substances include a substance containing cerium (Ce), which is a base metal.

Moreover, as shown in FIG. 6, the same HC supply valve (fuel injection injector) 30 as that described in the first embodiment is provided in the exhaust passage 3 on the upstream side of the carrier 20B.

And as shown in FIG. 6, on the upstream side of this carrier 20B, the upstream-side exhaust temperature sensor 21, the upstream-side NOx concentration sensor 22, and the upstream-side λ sensor 23 are provided. Also, on the downstream side of the exhaust-gas after-treatment device 10B, the downstream-side exhaust temperature sensor 24, the downstream-side NOx concentration sensor 25, and the downstream-side $O_2$ sensor 26 are provided. Moreover, when the exhaust-gas after-treatment device 10B is provided with the DPF, the differential pressure sensor 27 monitoring the clogged state of the DPF is provided.

Furthermore, as shown in FIG. 6, the control unit (ECU: engine control unit) 40 is provided as in the first embodiment.

And in this third embodiment, the control unit 40 is configured to have the following temperature-raising control means. This temperature-raising control means carries out temperature-raising control repeating the rich condition (R) and the lean condition (L) of the exhaust-gas G when the temperature of the exhaust-gas G (exhaust temperature) Tg is not higher than a given temperature (for example, 300° C.) even at a time other than the regeneration control of the exhaust-gas after-treatment device 10B such as the above DPF regeneration control, NOx catalyst regeneration control, sulfur-purge control and the like. The given temperature means a temperature below which each catalyst is not activated.

By this temperature-raising control, in the carrier 20, when the exhaust-gas G is in the rich condition, the reducing agent in the exhaust-gas G is oxidized by oxygen released from the oxygen storage capacitor substance. By this oxidation, the oxygen storage capacitor substance generates oxidation heat exceeding the heat absorption amount at oxygen release so as to raise the temperature of the carrier 20 carrying the oxygen storage capacitor substance. When the exhaust-gas G is in the lean condition, the temperature of the carrier 20 carrying the oxygen storage capacitor substance is raised by the heat generated at absorbing oxygen in the exhaust-gas G by the oxygen storage capacitor substance.

And by the temperature rise of the carrier 20, the temperature of the exhaust-gas G passing through the carrier 20 is raised. The exhaust-gas G of which temperature has been raised flows into the exhaust-gas after-treatment device 10, and thereby each catalyst in the exhaust-gas after-treatment device 10B is raised above the activation temperature. By activation caused by the temperature rise, improvement of PM oxidation/elimination and NOx reduction performance are promoted when the temperature of the exhaust-gas G is low at a time other than the regeneration control of the exhaust-gas after-treatment device 10B.

In the temperature-raising control of the exhaust-gas, the rich condition and the lean condition are repeated, and in the rich condition, the air-fuel ratio on the inlet side of the carrier 20B is brought to the rich side of λR=1.1 to 0.8 in the air excess ratio equivalent. Thus, by injection in the exhaust pipe or post injection, the reducing agent in the exhaust-gas G is supplied and control for creating a rich atmosphere is carried out for a given time period.

After this rich condition lasts for a given time period, the condition is brought to the lean one. In this lean condition, the injection in the exhaust pipe or post injection is stopped, and control to the lean side of λL=1.8 to 1.0 (however, λR<λL) in the air excess ratio equivalent is carried out. These controls are alternately repeated. The effect is larger at λR=1.0 to 0.8 and λL=1.8 to 1.0 (however, λR<λL).

The air-fuel ratio control of the exhaust-gas G is carried out by adjusting/controlling the amount of the reducing agent to be supplied into the exhaust-gas G so that the output value of the upstream-side air excess ratio sensor 23 on the inlet side of the carrier 20B becomes the respective target air excess ratios λR, λL. For the air-fuel ratio on the inlet side, an air-fuel ratio calculated from the intake amount and a load (fuel injection amount) can be used instead of the output value of the upstream-side air excess ratio sensor 23.

In this temperature-raising control, the ratio of time between control to the rich air-fuel ratio and control to the lean air-fuel ratio is set to rich-side control (R):lean-side control (L)=R:L=3:57 to 3:3. With regard to the time per cycle of the control to the rich air-fuel ratio and the control to the lean air-fuel ratio, for example, the time for control to the rich side is approximately 3 s to 5 s, while the time for control to the lean side is approximately is 3 s to 60 s, 1 to 20 times of the above. This rich/lean cycle is carried out while temperature-raising of the catalyst is needed.

The control flow of the exhaust-gas after-treatment system 1B including the temperature-raising control is the same as the control flow of the exhaust-gas after-treatment system 1 in the first embodiment. By this control flow, the temperature-raising control repeating the rich condition (R) and the lean condition (L) of the exhaust-gas G may be carried out when the temperature Tg of the exhaust-gas G is not higher than the given temperature Tc even at a time other than the regeneration control of the exhaust-gas after-treatment device 10B.

According to the method of raising the temperature in the exhaust-gas after-treatment device and the exhaust-gas after-treatment system 1B in the third embodiment, in the exhaust-gas after-treatment device 10B provided with at least one of the deNOx catalyst to reduce NOx in the exhaust-gas and the DPF to oxidize PM, by repeatedly bringing the air-fuel ratio of the exhaust-gas G to the lean condition and the rich condition at a time other than the NOx catalyst regeneration or the DPF regeneration, that is, by repeating the lean/rich cycle, the temperature of the carrier 20B can be raised utilizing the self-heating action at oxygen absorption of the oxygen storage capacitor substance. By this, the temperature of the exhaust-gas passing through the carrier 20B can be raised.

By this temperature rise of the exhaust-gas, even when the exhaust-gas temperature is low at idle driving or low-load driving, the temperature of the exhaust-gas can be raised, and the purification rates of NOx and PM can be improved, and moreover, if both the deNOx catalyst and the DPF are provided, both reactions of NOx reduction and PM oxidation can be improved at the same time.

The carrier 20B of the oxygen storage capacitor substance is formed separately from the exhaust-gas after-treatment device 10B. Thus, only by additionally providing it at the exhaust passage 3, the purification performance of the already installed exhaust-gas after-treatment device 10B can be improved when the exhaust-gas temperature is low.

Also, by providing the carrier 20B, even at the NOx catalyst regeneration operation for restoring the NOx absorption capability of the NOx absorption catalyst, the NOx catalyst regeneration operation for regenerating the active substance of the NOx direct reduction type catalyst and the DPF regeneration operation for forcedly burning/eliminating PM collected by the DPF in the exhaust-gas after-treatment device 10B, the heat generation reaction occurring at switching from the rich condition to the lean condition can be utilized by repeating the switching from the rich condition to the lean condition. Therefore, raising the temperature of the exhaust-gas to as high as 500° C. or above also makes great contribution.

In order to verify the effect of the oxygen storage capacitor substance and switching between the rich condition (R) and the lean condition (L) of the exhaust-gas G, experiments were conducted in the following examples.

EXAMPLE 1

In the first example, through the NOx direct reduction type catalyst 13 carrying the oxygen storage capacitor substance in the catalyst layer 51$d$ (51$c$, 51$d$) of the cordierite honeycomb 51$a$ shown in FIG. 2, a gas imitating the rich condition (R) of the exhaust-gas and a gas imitating the lean condition (L) of the exhaust-gas are passed through with a given time interval at a given temperature, and the change of the temperature in the vicinity of the catalyst surface is measured.

The exhaust-gas in the rich condition is imitated by a gas in which HC, NO, CO are mixed in nitrogen ($N_2$), which is an inactive gas. The exhaust-gas in the lean condition (L) is imitated by a mixed gas in which HC, NO, CO are mixed in a mixed gas of nitrogen ($N_2$) and oxygen ($O_2$) and moreover, adjusted to have the air excess ratio ($\lambda$) of 1.1.

Figure 8:
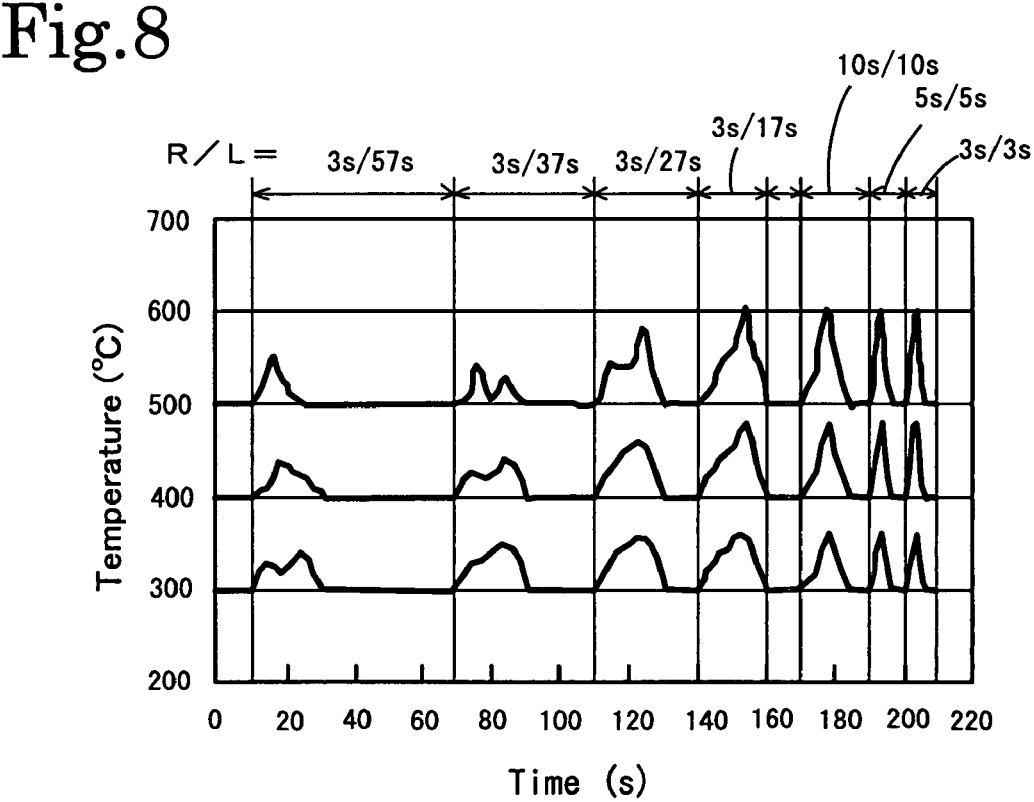
FIG. 8 is a view illustrating a change of a temperature in the vicinity of the catalyst surface in the first embodiment.

Then, as shown in FIG. 8, the gas temperature is set to 300° C., 400° C., and 500° C. Moreover, for each temperature, the ratio of time for the rich condition (R) and time for the lean condition (L) is changed to R/L=3 s/57 s, 3 s/37 s, 3 s/27 s, 3 s/17 s, 10 s/10 s, 5 s/5 s, 3 s/3 s and the experiments are conducted.

From the experimental results, it is verified that the temperature in the vicinity of the catalyst surface can be raised above the gas temperature by the oxygen storage capacitor substance and by switching between the rich condition (R) and the lean condition (L).

Moreover, it is known that the temperature change in the vicinity of the catalyst surface is different depending on the difference in the gas temperature and the time interval between the rich condition (R)/lean condition (L). That is, if the time interval between the rich condition (R)/lean condition (L) is constant, the lower the gas temperature passing through the honeycomb structure, the longer the temperature of the catalyst surface can be maintained at above the gas temperature. Also, if the gas temperature is constant, the shorter the time interval between the rich condition (R)/lean condition (L), the longer the temperature in the vicinity of the catalyst surface can be maintained at above the gas temperature. Particularly, the higher the gas temperature is, the larger this effect is.

EXAMPLE 2

Figure 9:
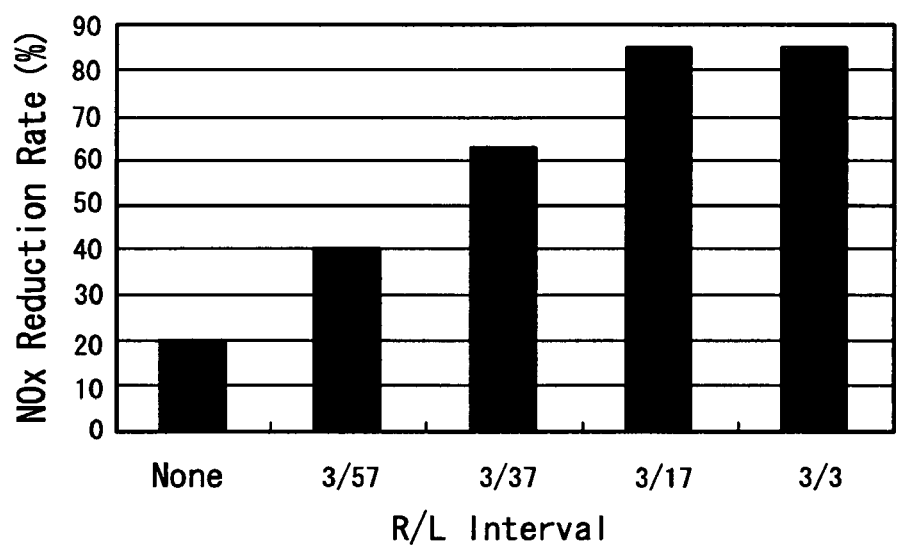
FIG. 9 is a view illustrating a relation between a NOx reduction rate and a time interval of a rich condition (R) and a lean condition (L) in the second embodiment.

Next, in a second example, the exhaust-gas after-treatment device is formed from the NOx direct reduction type catalyst carrying the oxygen storage capacitor substance in a catalyst layer in the configuration in FIG. 2. This exhaust-gas after-treatment device is installed in the exhaust passage of the engine. The time interval of the rich condition (R)/lean condition (L) of the exhaust-gas is changed to compare the reduction characteristics over the NOx in the exhaust-gas. The result is shown in FIG. 9. According to the result, it is known that active utilization of self-heating of the $CeO_2$ occurring at lean switching gives higher NOx reduction rate than the case not utilizing it ("none").

EXAMPLE 3

Cordierite honeycomb coated with a catalyst layer of platinum/aluminum oxide carrying an oxygen storage capacitor substance is crushed in a mortar and adjusted into a powder state. Moreover, PM sampled from the diesel exhaust-gas is added by 10 mass % and lightly mixed so as to prepare a mixed powder. This is made as a mixed powder of a third example.

Also, cordierite honeycomb coated with platinum/aluminum oxide as a catalyst layer is crushed in a mortar and adjusted into a powder state. Moreover, PM sampled from the diesel exhaust-gas is added by 10 mass % and lightly mixed so as to prepare a mixed powder. This is made as a mixed powder of a comparative example.

Next, similarly to the first example, the gas imitating the rich condition (R) of the exhaust-gas and the gas imitating the lean condition (L) of the exhaust-gas are switched with a given time interval and passed through at the temperature of 150° C., 200° C., 250° C., 300° C., 400° C., and the weight change during that period is measured.

Figure 10:
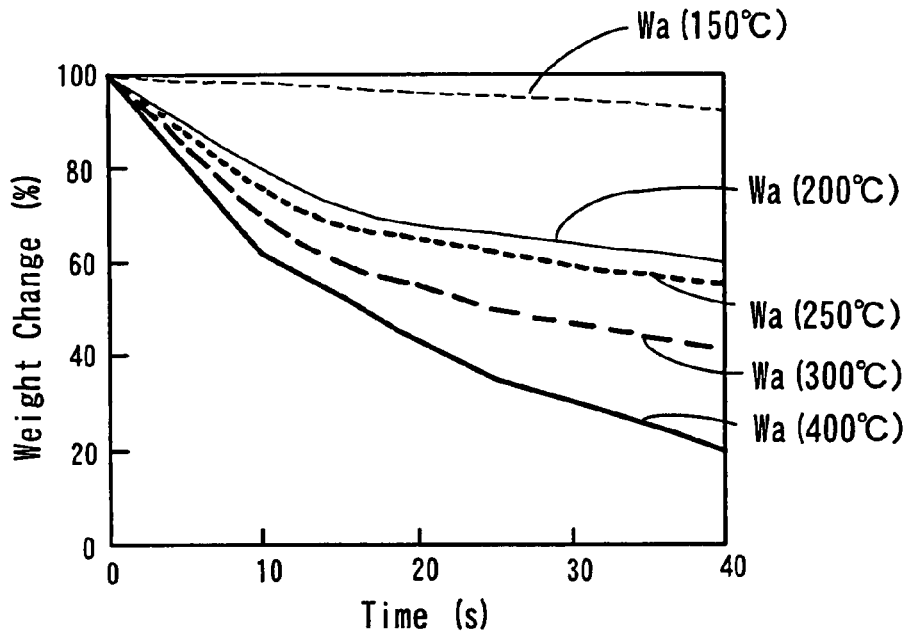
FIG. 10 is a view illustrating a weight change of the third embodiment.
Figure 11:
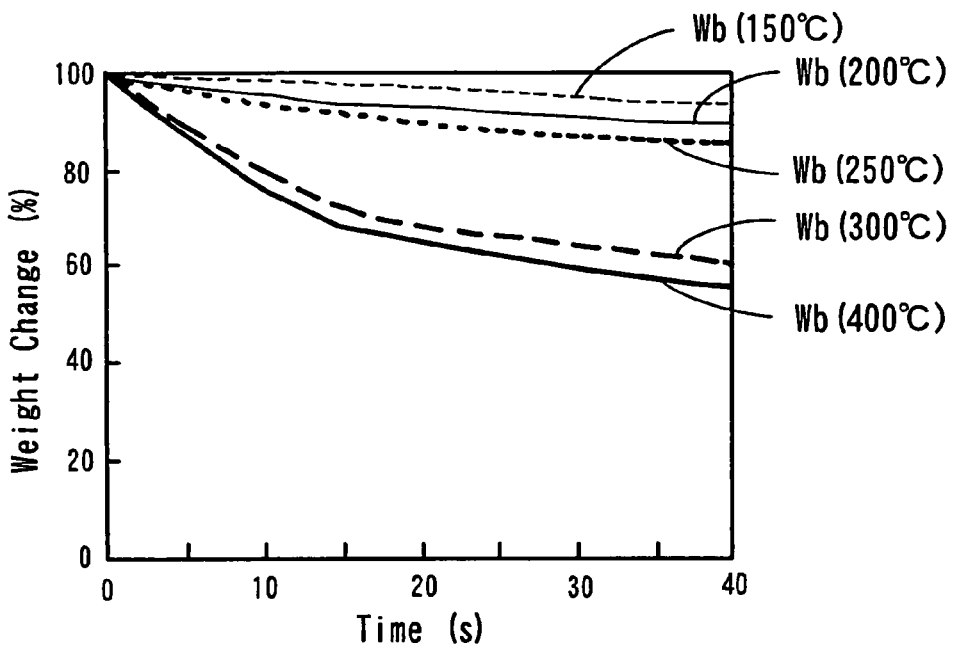
FIG. 11 is a view illustrating a weight change of a comparative example with the third embodiment.

The result is shown in FIG. 10 (example) and FIG. 11 (comparative example). According to this result, weight drop by PM oxidation is not found below 300° C. in the comparative example Wb. However, in the example Wa in FIG. 10, weight drop by PM oxidation is found from around 200° C. due to switching of the rich condition (R)/lean condition (L) of the gas. By this, the effect of heat generation by the oxygen storage capacitor substance is known.

EXAMPLE 4

Figure 12:
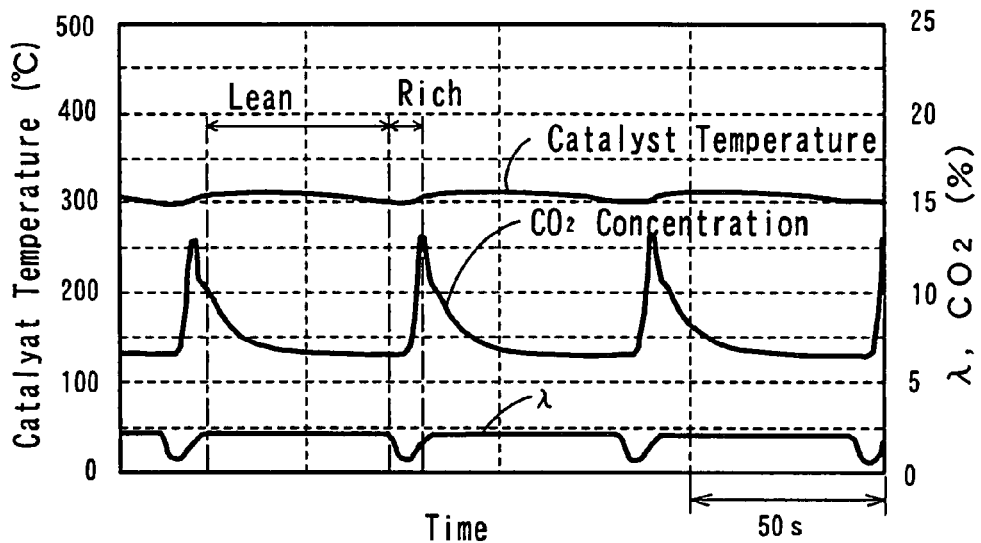
FIG. 12 is a view illustrating switching between the rich condition and the lean condition and a change over time of the catalyst temperature, $CO_2$ concentration in a fourth embodiment.
Figure 13:
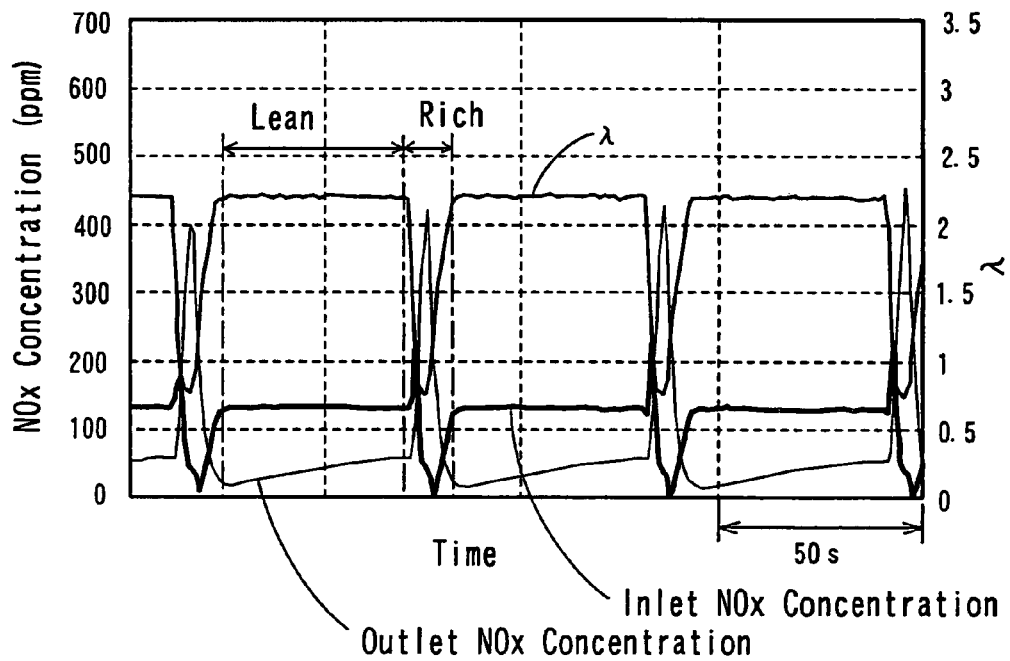
FIG. 13 is a view illustrating switching between the rich condition and the lean condition and a change over time of the inlet NOx concentration, outlet NOx concentration in the fourth embodiment.

In a fourth example, a DPF in which a cell of cordierite honeycomb coated with a catalyst layer of platinum/aluminum oxide carrying an oxygen storage capacitor substance with the exhaust-gas inlet side and outlet side alternately sealed is contained in a case so as to form the exhaust-gas after-treatment device. This exhaust-gas after-treatment device is installed at the exhaust passage of an engine. As shown in FIGS. 12 and 13, the time interval of the exhaust-gas rich condition (R)/lean condition (L) is changed, and the oxidation characteristics over the PM in the exhaust-gas are compared. As a comparative example, a DPF of cordierite honeycomb coated with a catalyst layer of platinum/aluminum oxide is formed.

Figure 14:
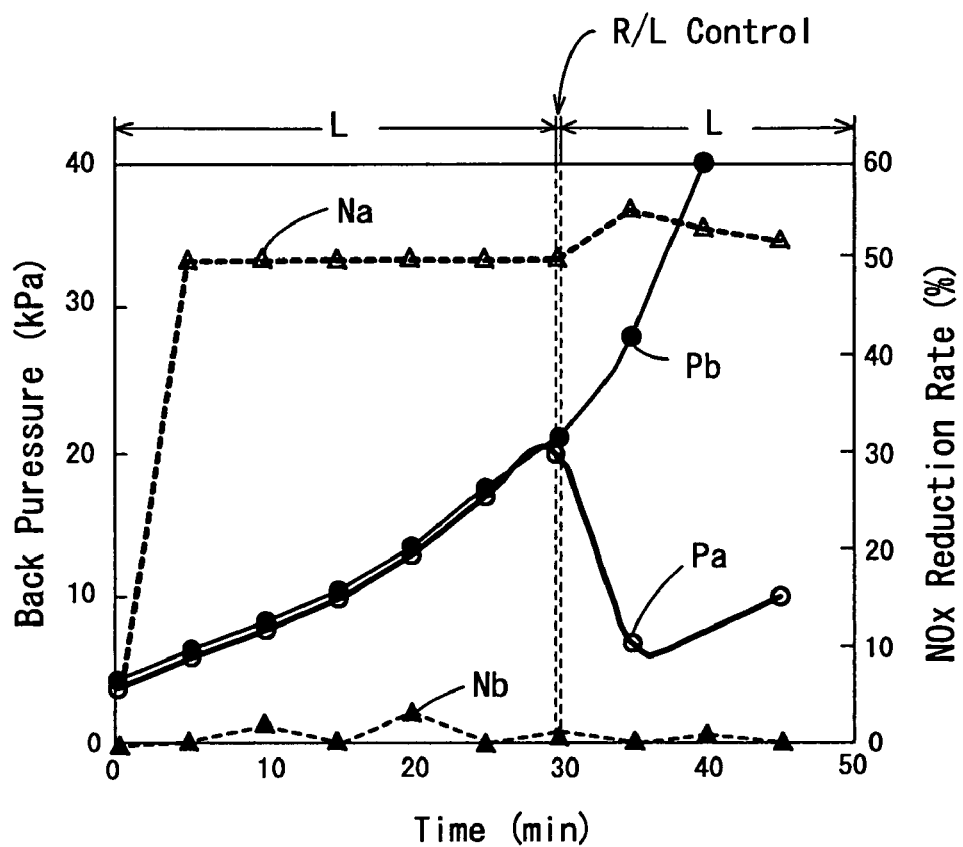
FIG. 14 is a view illustrating a back pressure and a change of the NOx reduction rate in the fourth embodiment and the comparative example.

In these exhaust-gas after-treatment devices, the exhaust-gas purification characteristics when the exhaust-gas temperature is 200° C. are compared. The result is shown in FIG. 14.

In the fourth example, the self-heating of $CeO_2$ occurring at switching from the rich condition (R) to the lean condition (L) is actively utilized. As shown in FIG. 14, the back pressure Pa in this example is capable of more efficient burning/elimination of PM in the rich condition (R) than the back pressure Pb in the comparative example even though the exhaust-gas temperature is as low as 200° C. Thus, in the example, after the rich condition (R), the back pressure Pa of the DPF is lowered, and the rise of the back pressure Pa can be maintained at a constant pressure or less. By this, it is known that the DPF can be continuously regenerated.

Moreover, even though the exhaust-gas temperature is as low as 200° C., the NOx reduction rate $N_a$ in the fourth example shows a high NOx reduction rate. By this, it is known that the NOx can be reduced at the same time with the PM oxidation. On the other hand, the NOx reduction rate Nb of the comparative example is close to zero.

EXAMPLE 5

In a fifth example, the carrier 20B in the third embodiment according to the present invention is arranged on the upstream side of the exhaust-gas after-treatment device 10B provided with the deNOx catalyst in the exhaust passage 3 of the diesel engine 2. Over the fifth example, a temperature Tn of the exhaust-gas flowing into the deNOx catalyst is measured by the exhaust temperature sensor 28 when the time interval of the rich condition (R)/lean condition (L) is repeatedly changed at R/L=3 s/57 s, 3 s/45 s, 3 s/30 s, and the NOx reduction rate is measured.

Also, as a comparative example 1 over the fifth example, the same experiments and measurements are conducted in the case of the exhaust-gas after-treatment device 10 only. Also, as a comparative example 2 over the fifth example, the same experiments and measurements are conducted in the case where the oxidation catalyst is arranged on the upstream side of the exhaust-gas after-treatment device 10. The results are shown in FIG. 15.

Figure 15:
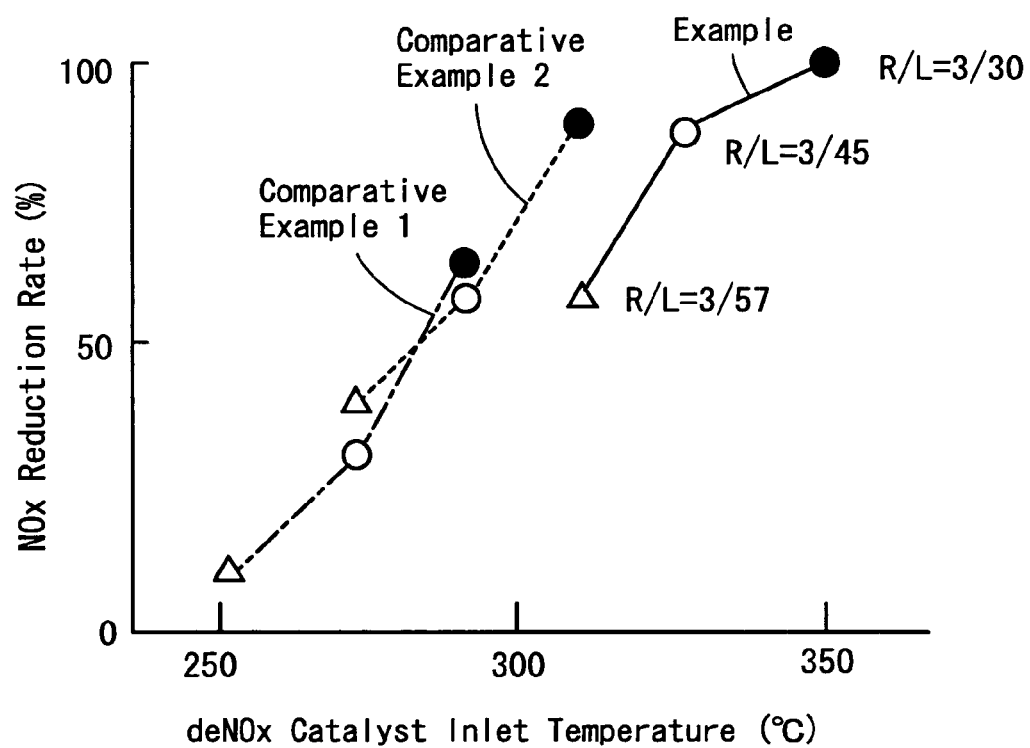
FIG. 15 is a view illustrating deNOx catalyst inlet temperature and a change of the NOx reduction rate in a fifth embodiment and the comparative examples 1 and 2.
Figure 16:
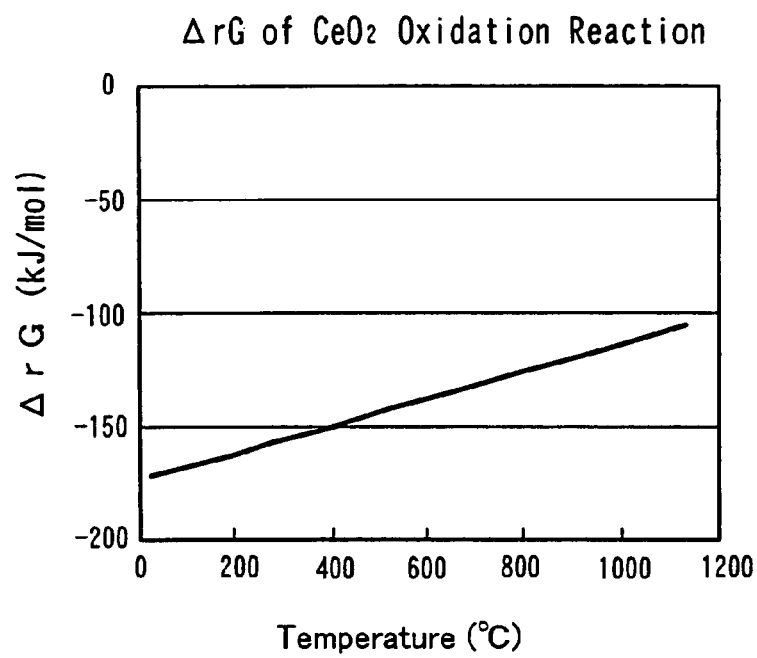
FIG. 16 is a view illustrating a relation between Gibbs free energy $\Delta rG°$ and a temperature relating to oxygen absorption reaction of cerium oxide.
Figure 17:
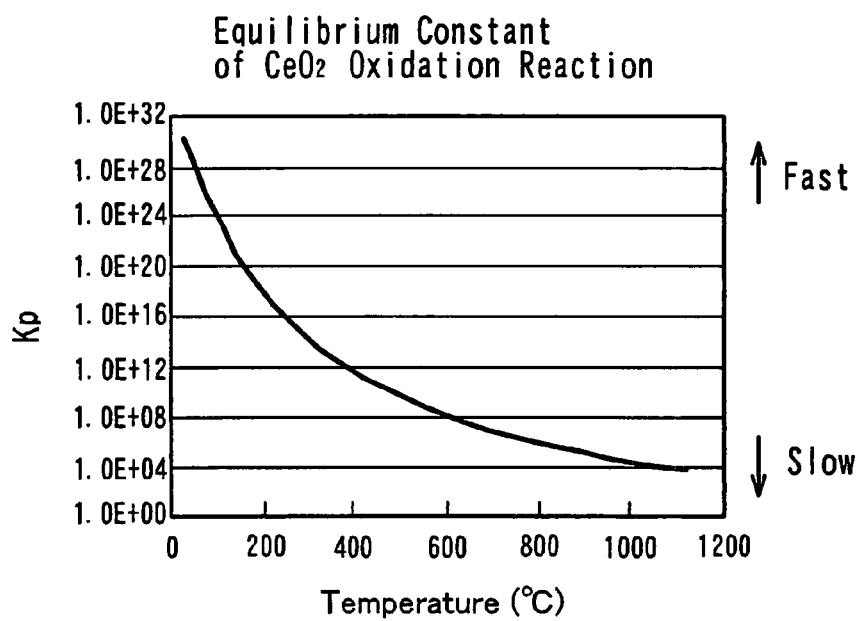
FIG. 17 is a view illustrating a relation between an equilibrium constant Kp and a temperature relating to oxygen absorption reaction of cerium oxide.
Figure 18:
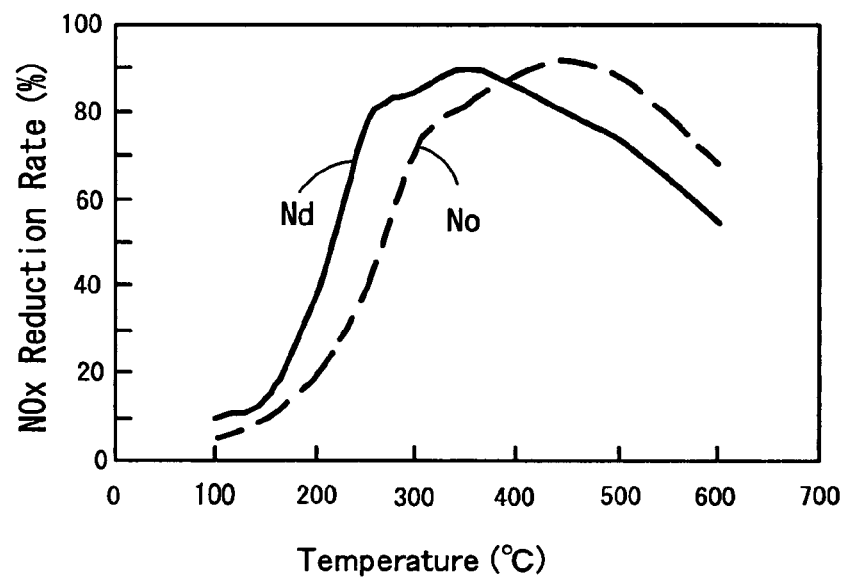
FIG. 18 is a view illustrating a relation between the reduction rates of the lean NOx trap catalyst and the NOx direct reduction type catalyst and the catalyst temperature.

According to FIG. 15, over the comparative example 1, the temperature rise of the exhaust-gas and NOx reduction rate are improved in the comparative example 2, and it is known that the oxidation catalyst is also effective. Moreover, it is known that the fifth example exerts an effect larger than the comparative example 2.

In FIG. 15, R/L is shown for 3/57 to 3/30. In the case of R/L of 3/10, 5/5, 3/3, the similar results to the case of R/L at 3/30 are also obtained. In the normal case, R/L at 3/30 is sufficient, but when rapid temperature rise is needed or in an extremely cold place, control of R/L at 3/3 can be preferably used.

INDUSTRIAL APPLICABILITY

The method of raising exhaust-gas temperature in the exhaust-gas after-treatment device and the exhaust-gas after-treatment system according to the present invention having the above-mentioned excellent effect can be extremely effectively utilized as a method of raising exhaust-gas temperature in an exhaust-gas after-treatment device and an exhaust-gas after-treatment system for treating an exhaust-gas and the like of an internal combustion engine mounted on an automobile.

What is claimed is:

1. A method of raising exhaust-gas temperature in an exhaust-gas after-treatment device, comprising:
   providing an oxygen storage capacitor substance which releases oxygen when an air-fuel ratio of an exhaust-gas is in a rich condition and stores oxygen as well as heats itself up in a lean condition; and
   controlling the air-fuel ratio of the exhaust-gas flowing into the exhaust-gas after-treatment device so that the rich condition and the lean condition are alternately repeated when the exhaust-gas temperature is not higher than a given temperature at a time other than regeneration control of the exhaust-gas after-treatment device,
   wherein in the rich condition, utilizing the heat generated by an oxidation reaction between the oxygen released from the oxygen storage capacitor substance and a reducing agent, and utilizing the self-heating generated by reversible oxidation reaction of the oxygen storage capacitor substance when alternating between the rich condition and the lean condition, the temperature of a catalyst surface carrying the oxygen storage capacitor substance is raised, and thereby the temperature of the exhaust gas after-treatment device is raised.

2. A method of raising exhaust-gas temperature in an exhaust-gas after-treatment device in an exhaust-gas after-treatment system, comprising:
   providing a carrier for carrying an oxygen storage capacitor substance which releases oxygen when an air-fuel ratio of an exhaust-gas is in a rich condition and stores oxygen as well as heats itself up in a lean condition on an upstream side;
   providing the exhaust-gas after-treatment device on a downstream side;
   controlling the air-fuel ratio of the exhaust-gas flowing into the carrier so that the rich condition and the lean condition are alternately repeated when an exhaust-gas temperature is not higher than a given temperature at a time other than regeneration control of the exhaust-gas after-treatment device,
   wherein in the rich condition, utilizing the heat generated by an oxidation reaction between the oxygen released from the oxygen storage capacitor substance and a reducing agent, and utilizing the self-heating generated by reversible oxidation reaction of the oxygen storage capacitor substance when alternating between the rich condition and the lean condition, the temperature of a catalyst surface carrying the oxygen storage capacitor substance is raised, and thereby the temperature of the exhaust gas after-treatment device is raised.

3. The method of raising exhaust-gas temperature in an exhaust-gas after-treatment device according to claim 1 or 2, further comprising selecting the exhaust-gas after-treatment device to include at least one of a deNOx catalyst and a diesel particulate filter.

4. The method of raising exhaust-gas temperature in an exhaust-gas after-treatment device according to claim 1 or 2, further comprising selecting a substance containing cerium element as the oxygen storage capacitor substance.

5. The method of raising exhaust-gas temperature in an exhaust-gas after-treatment device according to claim 1 or 2, further comprising selecting a ratio of time period in the rich condition and in the lean condition is set to rich condition:lean condition=3:57 to 3:3.

6. An exhaust-gas after-treatment system having an exhaust-gas after-treatment device, the exhaust-gas after-treatment device comprising:
   an oxygen storage capacitor substance which releases oxygen when an air-fuel ratio of the exhaust-gas is in a rich condition and stores oxygen as well as heats itself up in a lean condition; and
   a controller for the air-fuel ratio of the exhaust-gas flowing into the exhaust-gas after-treatment device so that the rich condition and the lean condition are alternately repeated when an exhaust-gas temperature is not higher than a given temperature at a time other than regeneration control of the exhaust-gas after-treatment device,
   wherein in the rich condition, the heat generated by an oxidation reaction between the oxygen released from the oxygen storage capacitor substance and a reducing agent is utilized, and the self-heating generated by reversible oxidation reaction of the oxygen storage capacitor substance when alternating between the rich condition and the lean condition is utilized, the temperature of a catalyst surface carrying the oxygen storage capacitor substance is raised, and thereby the temperature of the exhaust gas after-treatment device is raised.

7. The exhaust-gas after-treatment system according to claim 6, wherein a substance containing cerium element is used as the oxygen storage capacitor substance.

8. The exhaust-gas after-treatment system according to claim 7, wherein the exhaust-gas after-treatment device is formed of a wall-through type honeycomb structure, and a layer of the oxygen storage capacitor substance of the substance containing cerium element is formed on a surface side of an upstream-side wall surface of the wall-through type honeycomb structure.

9. The exhaust-gas after-treatment system according to claim 8, wherein layer of oxygen catalyst is formed on a wall surface side of a downstream-side wall surface of the wall-through type honeycomb structure and a layer of deNOx is formed on a surface side of the oxidation catalyst layer.

10. The exhaust-gas after-treatment system according to claim 8 or 9, wherein an oxidation catalyst layer is formed on a surface side of the deNOx catalyst layer formed on the surface side of the upstream-side wall surface of the wall-through type honeycomb structure.

11. The exhaust-gas after-treatment system according to claim 8 or 9, wherein in the oxygen storage capacitor substance layer, a carrying amount of the substance containing cerium element is set to 50 g/L to 200 g/L.

12. An exhaust-gas after-treatment system in which an exhaust-gas after-treatment device is arranged, comprising:
    a carrier for carrying an oxygen storage capacitor substance which releases oxygen when an air-fuel ratio of an exhaust-gas is in a rich condition and stores oxygen as well as heats itself up in a lean condition on an upstream side, and a controller for the air-fuel ratio of the exhaust-gas flowing into the carrier so that the rich condition and the lean condition are alternately repeated when the exhaust-gas temperature is not higher than a given temperature at a time other than regeneration control of the exhaust-gas after-treatment device,
    wherein in the rich condition, the heat generated by an oxidation reaction between the oxygen released from the oxygen storage capacitor substance and a reducing agent is utilized, and the self-heating generated by reversible oxidation reaction of the oxygen storage capacitor substance when alternating between the rich condition and the lean condition is utilized, the temperature of a catalyst surface carrying the oxygen storage capacitor substance is raised, and thereby the temperature of the exhaust gas after-treatment device is raised.

13. The exhaust-gas after-treatment system according to claim 12, wherein a substance containing cerium element is used as the oxygen storage capacitor substance.

14. The exhaust-gas after-treatment system according to claim 13, wherein a carrying amount of the substance containing cerium element in the carrier is set to 50 g/L to 200 g/L.

15. The exhaust-gas after-treatment system according to any one of claims 6, 7, 8, 9, 12, 13, and 14, wherein a ratio of time period in the rich condition and in the lean condition is set to rich condition:lean condition=3:57 to 3:3.

16. The exhaust-gas after-treatment device according to any one of claims 6, 7, 8, 9, 12, 13 and 14, wherein the exhaust-gas after-treatment device comprises at least one of a deNOx catalyst and a diesel particulate filter.

* * * * *